United States Patent [19]

Kanzaki et al.

[11] Patent Number: 5,542,085
[45] Date of Patent: Jul. 30, 1996

[54] METHOD FOR PRODUCING PROGRAM MODULES

[75] Inventors: Tsunao Kanzaki, Kawasaki; Kinji Mori, Machida; Yasuo Suzuki, Ebina; Hiroyuki Ogura, Hino; Kozo Nakai, Katsuta; Hirokazu Kasashima, Hitachi, all of Japan

[73] Assignees: Hitachi, Ltd.; Hitachi, Microcomputer System, Ltd., both of Tokyo, Japan

[21] Appl. No.: 734,226

[22] Filed: Jul. 22, 1991

[30] Foreign Application Priority Data

Jul. 24, 1990 [JP] Japan .................................. 2-197490
Aug. 22, 1990 [JP] Japan .................................. 2-220586

[51] Int. Cl.$^6$ .............................. G06F 17/30; G06F 9/44
[52] U.S. Cl. ....................... 395/600; 364/280.4; 364/286; 364/DIG. 1; 395/650
[58] Field of Search ..................... 395/275, 325, 395/600, 650, 159, 700, 500; 364/280.4, 286

[56] References Cited

U.S. PATENT DOCUMENTS

| | | | |
|---|---|---|---|
| 4,736,321 | 4/1988 | Brown et al. | 364/300 |
| 4,831,525 | 5/1989 | Saito et al. | 395/700 |
| 4,864,497 | 9/1989 | Lowry et al. | 364/300 |
| 4,949,253 | 8/1990 | Chigira et al. | 395/500 |
| 4,949,255 | 8/1990 | Gerth et al. | 364/200 |
| 4,967,348 | 10/1990 | Naito et al. | 395/600 |
| 5,084,813 | 1/1992 | Ono | 395/1 |
| 5,129,086 | 7/1992 | Coyle, Jr. et al. | 395/650 |
| 5,179,701 | 1/1993 | Chisholm | 395/600 |
| 5,187,787 | 2/1993 | Skeen et al. | 395/600 |
| 5,187,788 | 2/1993 | Marmelstein et al. | 395/700 |
| 5,212,634 | 5/1993 | Washizaki et al. | 364/400 |
| 5,230,049 | 7/1993 | Chang et al. | 395/700 |

FOREIGN PATENT DOCUMENTS

63-273132  11/1988  Japan .

OTHER PUBLICATIONS

"The N-Version Approach to Fault Tolerant Software," IEEE Transactions on Software Engineering, vol. SE-11, No. 2, Dec. 1985, pp. 1491-1501.

*Primary Examiner*—Thomas G. Black
*Assistant Examiner*—Hosain T. Alam
*Attorney, Agent, or Firm*—Antonelli, Terry, Stout & Kraus

[57] ABSTRACT

In a software distributedly preparing method for preparing a plurality of program modules combined by exchange of message data, in generating software modules and message data, repetition or similarity in the defined contents of the message data and multiple definition of a data item constituting the message data, and the defined contents of the message data are unified or separated to assure its consistency and preparing it as a data base which will be used in preparing a software module.

4 Claims, 31 Drawing Sheets

CONCEPTUAL VIEW OF THE PRESENT INVENTION

FIG. 1A
MESSAGE UNIFICATION
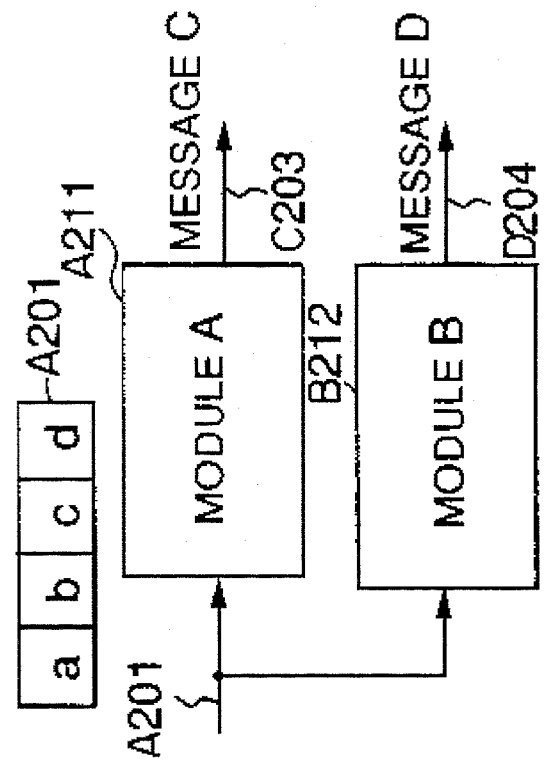
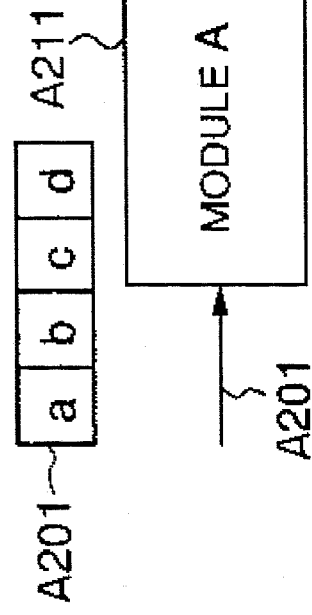

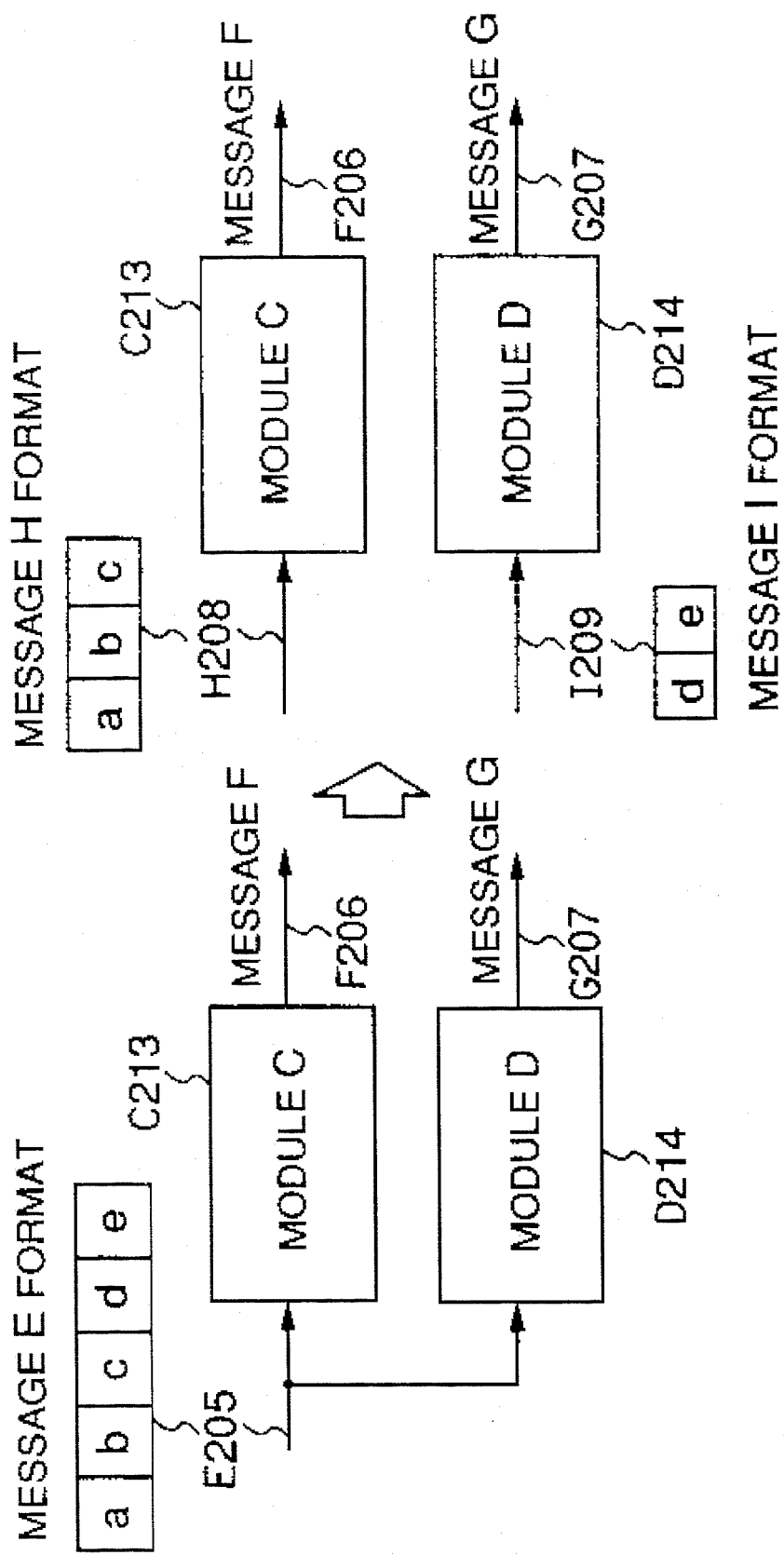
FIG. 1B MESSAGE SEPARATION

FIG.8

| | MESSAGE A | MESSAGE B | MESSAGE C | MESSAGE D | MESSAGE E | MESSAGE F | MESSAGE G | MESSAGE H | MESSAGE I | ... |
|---|---|---|---|---|---|---|---|---|---|---|
| 220 — DATA ITEM a | * | | | | * | | | * | | |
| 221 — DATA ITEM b | * | * | | | * | | | * | | |
| 222 — DATA ITEM c | * | * | | | * | | | * | * | |
| 223 — DATA ITEM d | * | | | | * | | | | * | |
| 224 — DATA ITEM e | | | * | * | * | | | | | |
| · | | | * | * | | | | | | |
| · | | | | * | | | | | | |
| · | | | | | | | * | * | | |

FIG. 10

|  |  | 211 | 212 | 213 | 214 |  |
|---|---|---|---|---|---|---|
|  |  | MODULE A | MODULE B | MODULE C | MODULE D | • • • |
| 201 | MESSAGE A | I |  |  |  |  |
| 202 | MESSAGE B |  | I |  |  |  |
| 203 | C | O |  |  |  |  |
| 204 | D |  | O |  |  |  |
| 205 | E |  |  | I | I |  |
| 206 | F |  |  | O |  |  |
| 207 | G |  |  |  | O |  |
|  | H |  |  |  |  |  |
|  | I |  |  |  |  |  |

CONCEPTUAL VIEW OF THE PRESENT INVENTION

ARRANGEMENT OF DATA STRUCTURE TRANSFORMATION

PROCESSING OF DATA STRUCTURE TRANSFORMATION

CONTENT CODE FILE

FIG. 20

DATA ITEM FILE

| DATA ITEM NAME | DATA UNIT LENGTH | SIZE OF DIMENSION | DATA CODE | SIGNED OR UNSIGNED |
|---|---|---|---|---|
| | | | | |
| | | | | |
| | | | | |

1131, 1132, 1133, 1134, 1135, 1032

FUNCTIONAL MODULE FILE

FIG. 22

CONTENT CODE (1031):
```
CATIND /*COIL HANDLING INFORMATION
         AT EXIT SIDE*/
  dzclno dcldia
CATOUD /*COIL HANDLING INFORMATION
         AT ENTRANCE SIDE*/
  dcofmx dcitip
SAIREQ /*DIRECTION INFORMATION FOR
         COLLECTING HANDLING DATA*/
```

DATA ITEM (1032):
```
dcitip long  /*NUMBER OF TRIMMED PLATE
               AT ENTRANCE SIDE*/
dcldia long  /*COIL DIAMETER AT EXIT
               SIDE*/
dcofmx long  /*CPC OFFSET AT ENTRANCE
               SIDE*/
dcspkt long  /*COMPLETION OF COILING AT
               EXIT SIDE*/
dzclno har [24]  /*COIL IDENTIFICATION
                   NUMBER AT EXIT ZONE*/
```

FUNCTIONAL MODULE (1033):
```
CATLOGO 1 CATIND CATOUD
          /*COLLECTING OF COIL HANDLING
             AT ENTRANCE SIDE*/
SADCRVO 1  SCODSQ  SDCDSQ
SADCRVO 2          SINRTN
SADCRVO 3          STROCO
```

1024: AUTOMATIC GENERATION OF LANGUAGE A PROGRAM INPUT/OUTPUT PROCEDURES

INPUT PROCEDURE (1296):
```
# include CATLOGO1.h
rcvmsg cprfc, psmsg, prbfsz)   ← 1291
dzclno (i:i) = (har(idtoodi))  ← 1292
dcldia = idtool                ← 1294
c /*RCVMSG END*/
c /*PROCEDURE START*/
```

OUTPUT PROCEDURE (1297):
```
c /*PROCEDURE END*/            ← 1295
odtoo = dcofmx
odtool = dcitip
sndmsg(pstfc, prmsgc, obuf00)  ← 1293
end
```

FIG. 23

```
@ GEVERATE
  PROC CATLPR (CATLEN)
  RCVMSG ( PFC,  PMSGC,  PBFSZ)              /*RCVMSG END*/
  DCLDIA = FCT1,  DZCLNO :                    /*PROCEDURE START*/
  DCLDIA = FCT1,  DCLDIA :

/*PROCEDURE END*/

FCO1 · DCOFMX = DCOFMX :
  FCO1 · DCITIP = DCITIP :
  SNDMSG ( PFC,  PMSG ) :
                                              /*SNDMSG END* 1
                                              END DATLPR
```

1281 — INPUT PROCEDURE
1286
1282, 1284 (header area)
1285, 1283 — OUTPUT PROCEDURE
1287

1025 — AUTOMATIC GENERATION OF LANGUAGE B PROGRAM INPUT/OUTPUT PROCEDURES

1031 — CONTENT CODE

CATIND/*COIL HANDLING INFORMATION AT EXIT SIDE*/
  dzclno dcldia
CATOUD/*COIL HANDLING INFORMATION AT ENTRANCE SIDE*/
  dcofmx dcitip
SAIREQ./*DIRECTION INFORMATION FOR COLLECTING HANDLING DATA*/

1032 — DATA ITEM dcitip long   /*NUMBER OF TRIMMED PLATE AT ENTRANCE SIDE*/
dcldia long   /*COIL DIAMETER AT EXIT SIDE*/
dcofmx long   /*CPC OFFSET AT ENTRANCE SIDE*/
dcspkt long   /*COMPLETION OF COILING AT EXIT SIDE*/
dzclno har [24]  /*COIL IDENTIFICATION NUMBER AT EXIT ZONE*/

1033 — FUNCTIONAL MODULE

CATLOGO 1 CATIND CATOUD
         /*COLLECTING OF COIL HANDLING AT ENTRANCE SIDE*/
SADCRVO 1   SCODSQ   SDCDSQ
SADCRVO 2            SINRTN
SADCRVO 3            STROCO
```

FIG. 24

1271 INPUT PROCEDURE
1272, 1274
1275, 1273 OUTPUT PROCEDURE
1276
1277

```
include CATALOGO1. h
main ( )
{
    rcvmsg ( &fc, pmsg, bfrz ;
    dzclno [ i ] = * msgb ;
    dcldia = * ( msgb++ ) ;
    /*RCVMSG END*/
    /*PROCEDURE START*/

/*PROCEDURE END*/
    * ( msgp++ ) = dcofmx ;
    * ( msgp++ ) = dcitip ;
    sndmsg ( &fc, &msg ) ;
    /*SNDMSG END*/
}
```

1026 AUTOMATIC GENERATION OF LANGUAGE C PROGRAM INPUT/OUTPUT PROCEDURES

1031 CONTENT CODE
```
CATIND /*COIL HANDLING INFORMATION
         AT EXIT SIDE*/
    dzclno dcldia
CATOUD /*COIL HANDLING INFORMATION
         AT ENTRANCE SIDE*/
    dcofmx dcitip
SAIREQ /*DIRECTION INFORMATION FOR
         COLLECTING HANDLING DATA*/
```

1032 DATA ITEM
```
dcitip  long  /*NUMBER OF TRIMMED PLATE
                AT ENTRANCE SIDE*/
dcldia  long  /*COIL DIAMETER AT EXIT
                SIDE*/
dcofmx  long  /*CPC OFFSET AT ENTRANCE
                SIDE*/
dcspkt  long  /*COMPLETION OF COILING AT
                EXIT SIDE*/
dzclno  har   /*COIL IDENTIFICATION NUMBER
                AT EXIT ZONE*/
```

1033 FUNCTIONAL MODUE
```
CATLOGO 1 CATIND CATOUD
          /*COLLECTING OF COIL HANDLING
             AT ENTRANCE SIDE*/
SADCRVO 1  SCODSQ  SDCDSQ
SADCRVO 2          SINRTN
SADCRVO 3          STROCO
```

CONTENT CODE EDITING PROGRAM

PROGRAM OF AUTOMATICALLY GENERATING LANGUAGE A PROGRAM INPUT/OUTPUT PROCEDURES

PROGRAM OF AUTOMATICALLY GENERATING LANGUAGE B PROGRAM INPUT/OUTPUT PROCEDURES

PROGRAM OF AUTOMATICALLY GENERATING LANGUAGE C PROGRAM INPUT/OUTPUT PROCEDURES

METHOD FOR PRODUCING PROGRAM MODULES

BACKGROUND OF THE INVENTION

The present invention relates to a software preparing method, and more particularly to a method for creating a software module and message data when the software module is developed in a distributed system, and a method for preparing a data-flow-structured program with the I/O specification defined by message data using multiple program languages.

In a program development supporting system in which programs are designed in module structures and the modules are individually formed, in order to make it easy to change the program, there is proposed a method of analyzing the portion of a program source to be changed to investigate its influencing range, as disclosed in JP-A-63-273132. This method is silent on assuring consistency of designed data in designing software to support program development.

Further, generally, where a self-distributed software module is to be developed, its processing contents are determined after input and output messages are defined. In particular, in developing the software module in a distributed manner, in order to assure consistency with the module and message data already developed, on the basis of the design specifications, non-definition and multi-definition of message data used by the module are checked and they are unified or separated.

The above prior art has the following defects. First of all, if software is developed in a distributed manner, the message data which is the same as or analogous to the message data already defined may be defined.

Secondly, the presence of the message data having the same structure means that the message data defined later is not required or unified with the prior message data. The presence of the message data having the analogous structure should be reconsidered to determine whether or not they are really required or if they should be unified or separated.

Further, the data item already defined may be multi-defined.

Meanwhile, development of multiple programs prepared in a different language through the same function for fault tolerance is disclosed in e.g., "The N-Version Approach to Fault-Tolerant Software", IEEE Transaction on Software Engineering, Vol. SE-11, No. 2, December 1985, pp. 1491–1501.

FIG. 14 is a block diagram showing the conventional method of preparing multiple programs for the same function specifications.

In the conventional method, as seen from FIG. 14, the function specification 711 described in an application term is interpreted to prepare processing specifications 712, 713 and 714 corresponding to different languages; individual programs are prepared based on these processing specifications. An operator understands the sentence in the function specification 711 to prepare at least one of the processing specification 712 corresponding to language A, the processing specification 713 corresponding to language B and the processing specification 714 corresponding to language C. Specifically, the operator determines the data items which can be dealt with by the corresponding languages on the basis of the corresponding processing specifications. It should be noted that the function specification on the basis of which of the individual processing specifications are prepared must be interpreted and converted in terms of different programs for respective languages.

Thus, the corresponding language A program 715, language B program 716 and language C program 717 can be prepared.

Now it is assumed that the function specification 711 includes the function specification defined by a sentence, but does not take the form such as a module structure, data item structure, etc. which can be understood by a certain computer. Specifically, the function specification 711 expresses the function to be demonstrated using languages and terms of an application or user, in the fashion e.g. the "tracking of a steel material plate is carried out within a zone corresponding to a tandem mill". On the other hand, the processing specification expresses the contents of a computer processing for realizing the contents of the function specification using the language for a program processing, in the fashion of e.g. "a tracking initial state is prepared referring to an index table".

As described above, the prior art individually prepares the processing specifications corresponding to different programs so that it is very disadvantageous in the viewpoint of production efficiency and cost in the case where multiple programs for the same function are to be prepared for fault tolerance. For this reason, the above prior art has not been put into practice.

SUMMARY OF THE INVENTION

The first object of the present invention is to solve the above problems and to provide a distributed development software preparing method which can improve the efficiency in the step of preparing a module by finding multi-definition and similarity of message data in designing a self-distributed software module and unifying or separating them to assure the consistency among them, and further to improve developing efficiency of the entire system in such a manner that a prepared module can be easily added to an existing system.

The second object of the present invention is to provide a method for preparing multiple programs for the same function specification which can automatically prepare a program to be used at an I/O processing on the basis of I/O data and thus can automatically prepare multiple programs that have the same function and are described in different languages.

The third object of the present invention is to provide a method for preparing multiple programs for the same function specification which can interpret the expression formats of I/O data so as to coincide with the function of a programming language without changing the definition contents of the I/O data.

In order to attain the first object, in the present invention, in preparing a distributed software module and message data, repetition and similarity in the definition contents of the message data and multiple definition of data items are previously checked to unify/separate these definition contents so as to provide a data base in a consistent format. In actually preparing the module, the definition contents extracted from the data base are used to improve the production efficiency in a distributed system.

In the present invention, the module is defined by a module name, an input message name and an output message name. The message is defined by a message name and data item names constituting it. Further, the data item is defined by a data item name and attribute and the number of dimensions thereof.

Such a definition manner implies the following. If, in defining message data, the message having the same data item names as those constituting the message at issue has already been defined, it means that the message having the same contents as those of the message at issue already exists.

If, in defining a message data, the message having some of the same data item names as those constituting the message at issue has already been defined, it means that the message having the contents similar to that of the message at issue already exists, i.e. there is the possibility of unification/separation of the messages.

Further, if, in defining a data item, the data item having the same data item name as that of the data item at issue has been already been defined, it means that the data item having the same contents as those of the data item at issue already exists.

In this way, multi-definition and similarity have been checked and the data base of definition contents can be provided to assure consistency through the technique of unification/separation. In preparing the module, necessary I/O messages and data items are extracted to be developed as a program.

Thus, the above module preparing method can provide more improved productivity than the method of preparing the module using a general editor looking at the specification. Further, it can be seen that the I/O message data of the module prepared is not contradictory with the existing system constituted by the module and message data designed and developed in the present invention so that the module prepared can be loaded in a state with no contradiction, thus improving productivity of the entire system.

In order to attain the above second object, the present invention has the following features. (A) A definition sentence defining the correlation with the other module in terms of only an input and output is supplied to a processor, and the processor prepares an input processing procedure and an output processing procedure based on plural languages using an I/O procedure automatically preparing program for plural language programs and an editing program for plural files which are provided in the processor. (B) The I/O automatically preparing program for plural language programs interprets an input definition so that it coincides with the function of a desired programming language. (C) The I/O automatically preparing program for plural language programs analyzes an input function specification to check if the structure of data items defined coincide with the structure which can be permitted by a language. If the answer is "YES", a changed name is prepared (the processing of changing a data name in a multi-layer structure is included). A determination is made to check if the changed name is registered with double definition and thereafter the name of a data item is renewed and registered.

In accordance with the present invention, a program to be designed is divided into an input processing procedure, an output processing procedure and an application processing procedure. In designing the program, plural kinds of programs for different languages each constituted by only the input processing procedure and the output processing procedure are prepared. After the I/O program has been prepared, the application processing procedure described by the language used in an individual program is added. Thus the same I/O specification can be used to prepare individual programs for different languages.

The data structure of data items defined is changed so as to coincide with the function of a desired programming language. Specifically, the input/output procedure is defined by a variable name in a data item level so that the program having the format which can be accepted by a compiler can be automatically prepared. In case a language cannot deal with the hierarchical structure of data items, a variable name in a single layer structure is prepared. Accordingly, the program preparing method according to the present invention can deal with a large number of programming languages.

BRIEF DESCRIPTION OF THE DRAWINGS

FIGS. 1A and 1B are views for explaining the concepts of unification and separation of messages in one embodiment of the present invention, respectively;

FIG. 8 is a view of a field for checking the definition contents of message data and data items in one embodiment of the present invention;

FIG. 10 is a view of a field for checking the definition contents of software modules and message data in one embodiment of the present invention;

FIG. 20 is a detailed view of the data item file in FIG. 18;

FIG. 22 is a view showing the outline of an automatic generation program of input and output procedures with program language A;

FIGS. 23 and 24 are views showing the outline of automatic generation programs of input and output procedure with program languages B and C, respectively;

DESCRIPTION OF THE PREFERRED EMBODIMENTS

Figure 2:
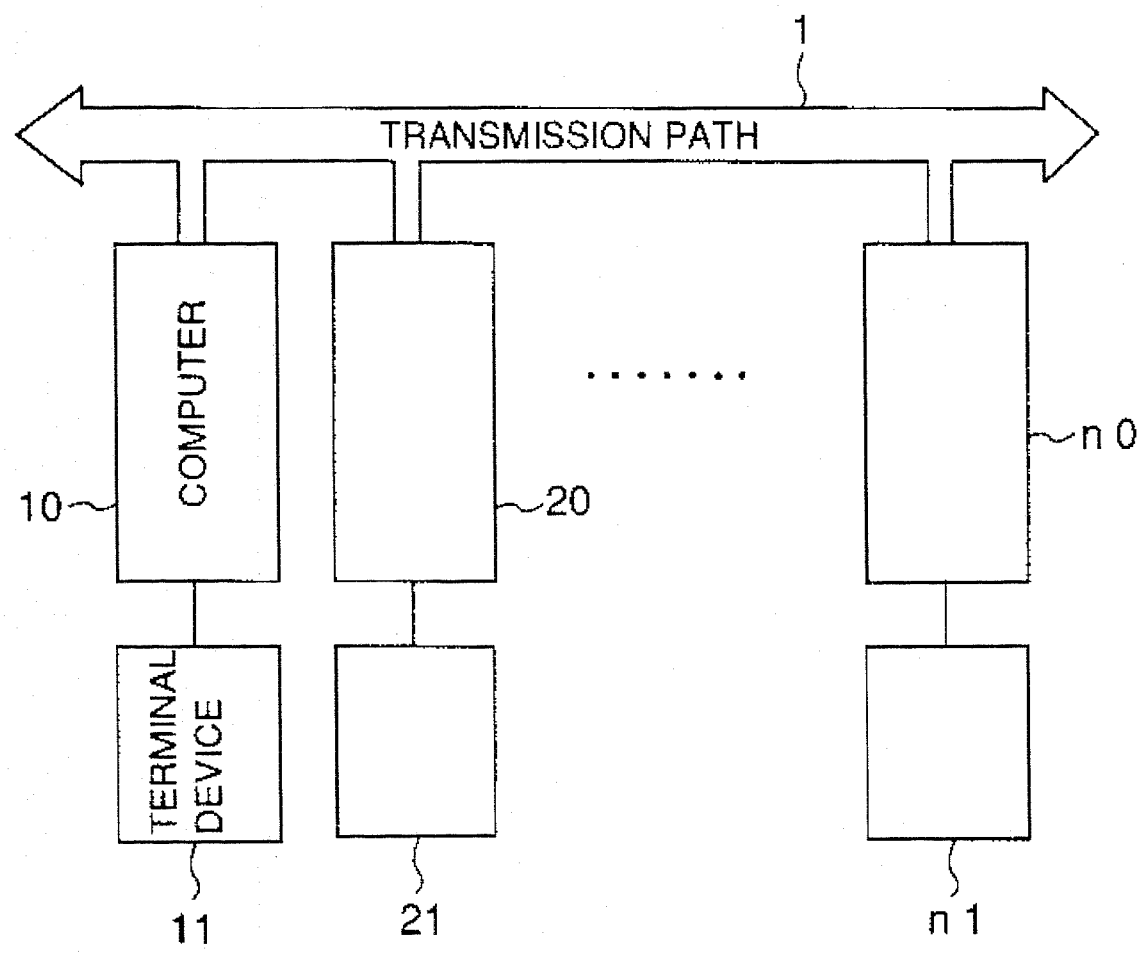
FIG. 2 is a view showing the arrangement of a computer system to which the distributed development software designing method according to the present invention is to be applied.

Now referring to the drawings, an explanation will be given of one embodiment of the present invention.

FIG. 2 shows an arrangement of the computer system to which the distributed development software designing method according to the present invention is applied.

In this embodiment, computers 10, 20, . . . , n0 which are interconnected with each other transmit/receive data among them. These computers 10, 20, . . . , n0 are connected with their corresponding terminal devices 11, 21, . . . , n1.

Figure 3:
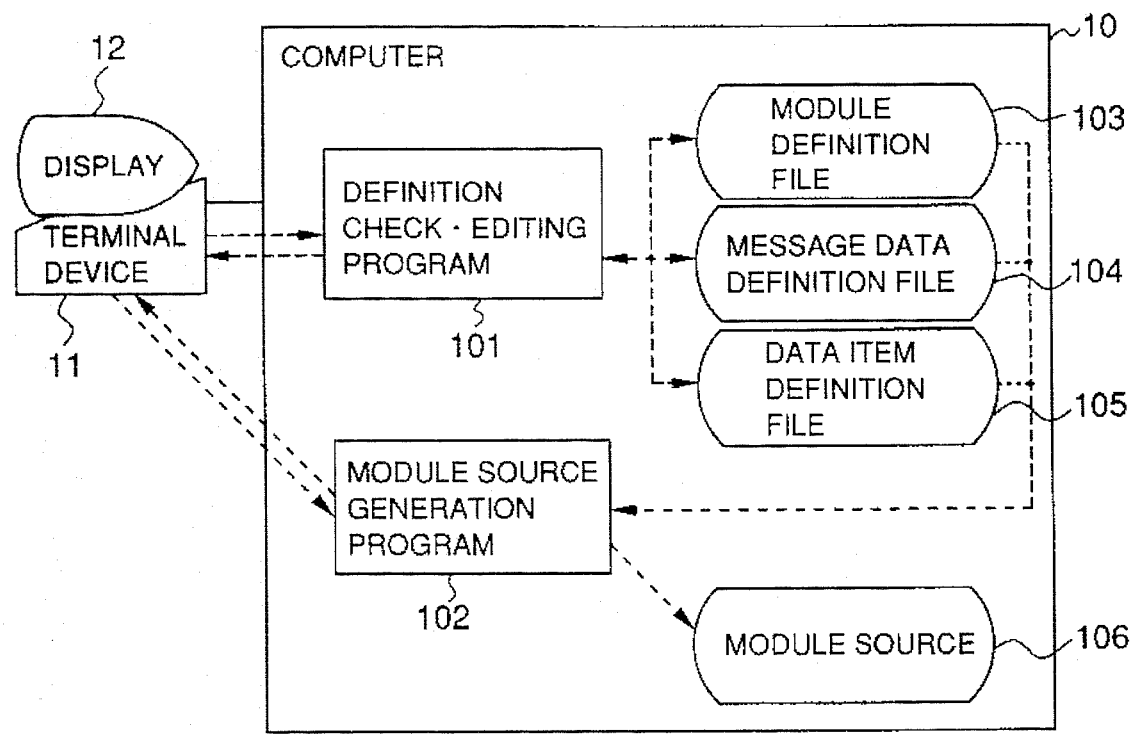
FIG. 3 is a view for explaining the function arrangement of a computer in one embodiment of the present invention.

FIG. 3 explains the arrangement of functions included in the computer in one embodiment of the present invention.

In FIG. 3, 101 denotes a program for defining, checking and editing; 102 denotes a module source producing program; 103 denotes a module definiton file; 104 denotes a message data definition file; 105 denotes a data item definition file; and 106 denotes a module source file.

For example, in the computer 10 of FIG. 2, the data input from the terminal device 11 equipped with a display 12, i.e. definition data are checked by the program 101, and the data modified thus interactively are stored in the definition files 103 to 105.

The program 102 extracts the definition data with assured consistency from the definition files 103 to 105 to be stored in the file 106 as a module source.

Figure 4:
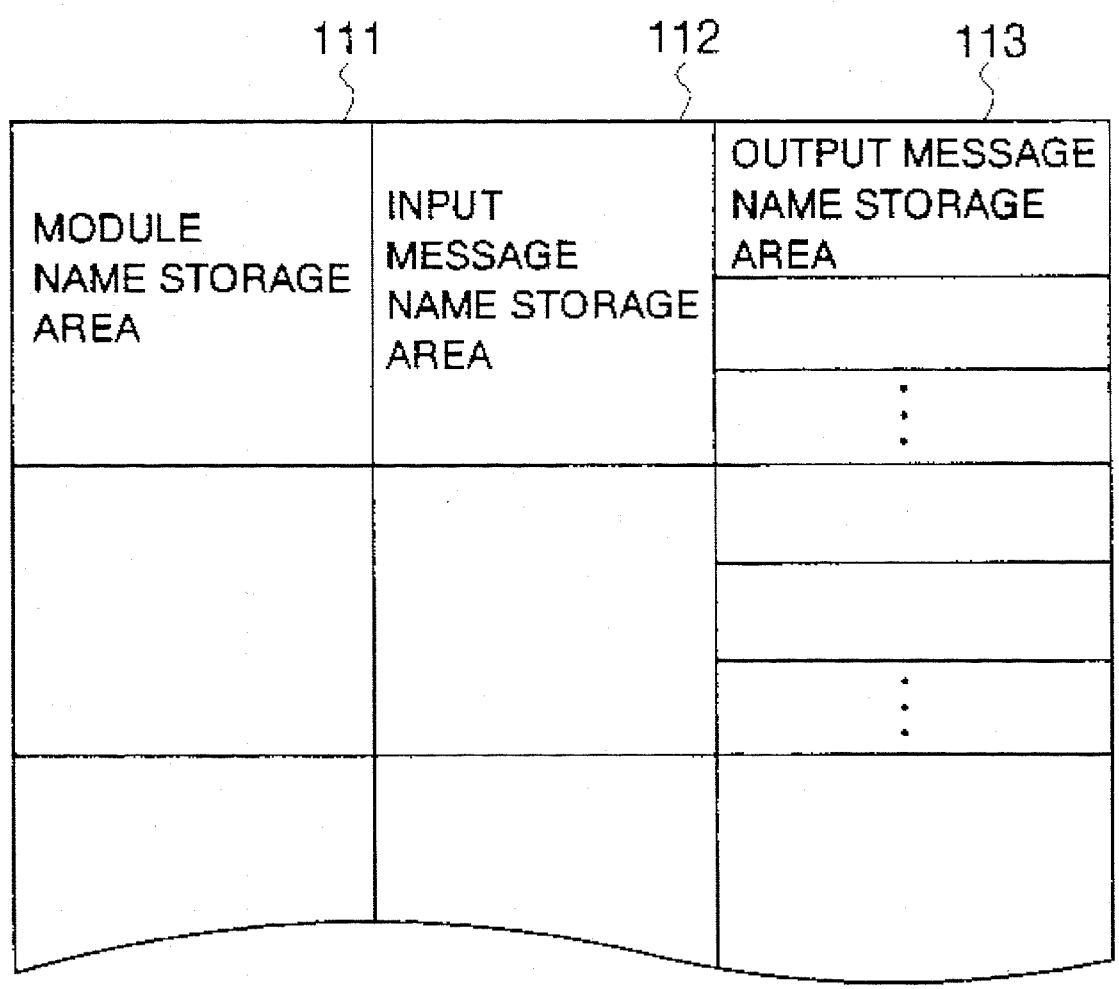
FIG. 4 is a view for explaining the file format of a module definition file in one embodiment of the present invention.

FIG. 4 explains the file format of the module definition file in one embodiment of the present invention. In this embodiment, one module definition is composed of a module name storage area 111, an input message name storage area 112 indicative of the input message of the module at issue, and an output message name storage area 113 indicative of the output message of the module at issue.

Figure 5:
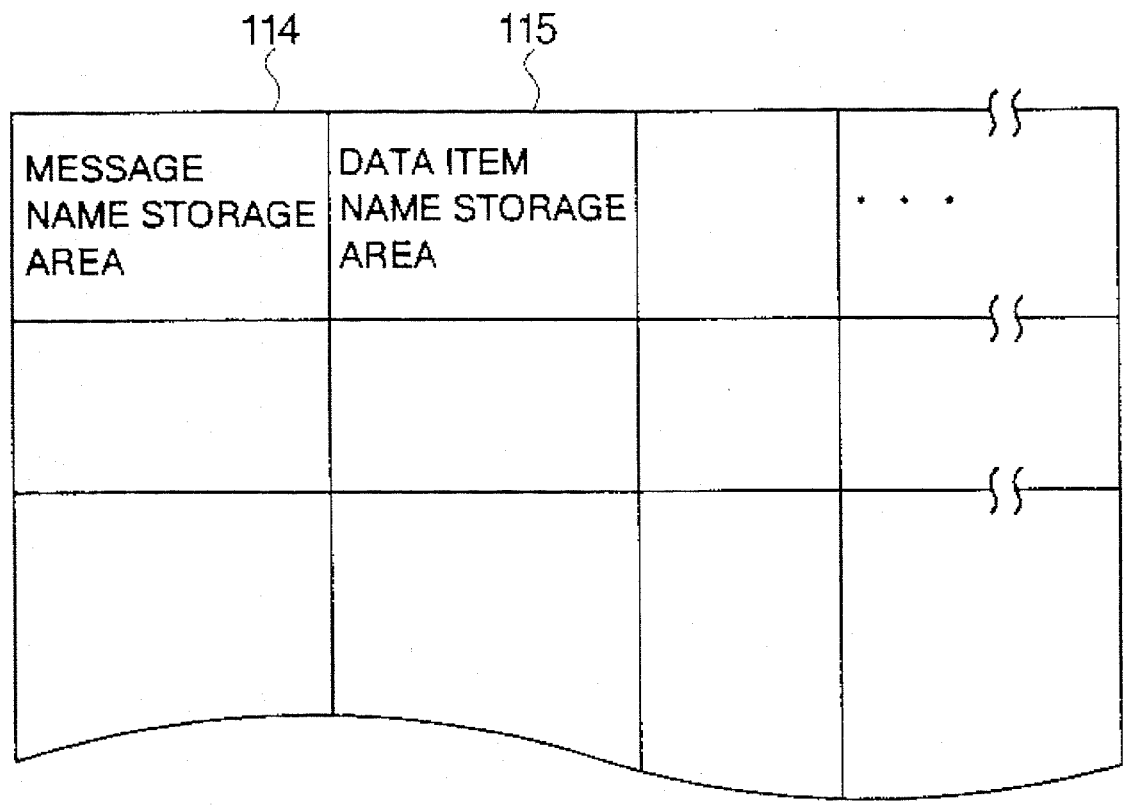
FIG. 5 is a view for explaining the file format of a message data definition file in one embodiment of the present invention.

FIG. 5 explains the file format of the message data definition file in one embodiment of the present invention. In this embodiment, one message data definition is composed of a message data name storage area 114 and a message data name storage area 115 constituting the message data.

Figure 6:
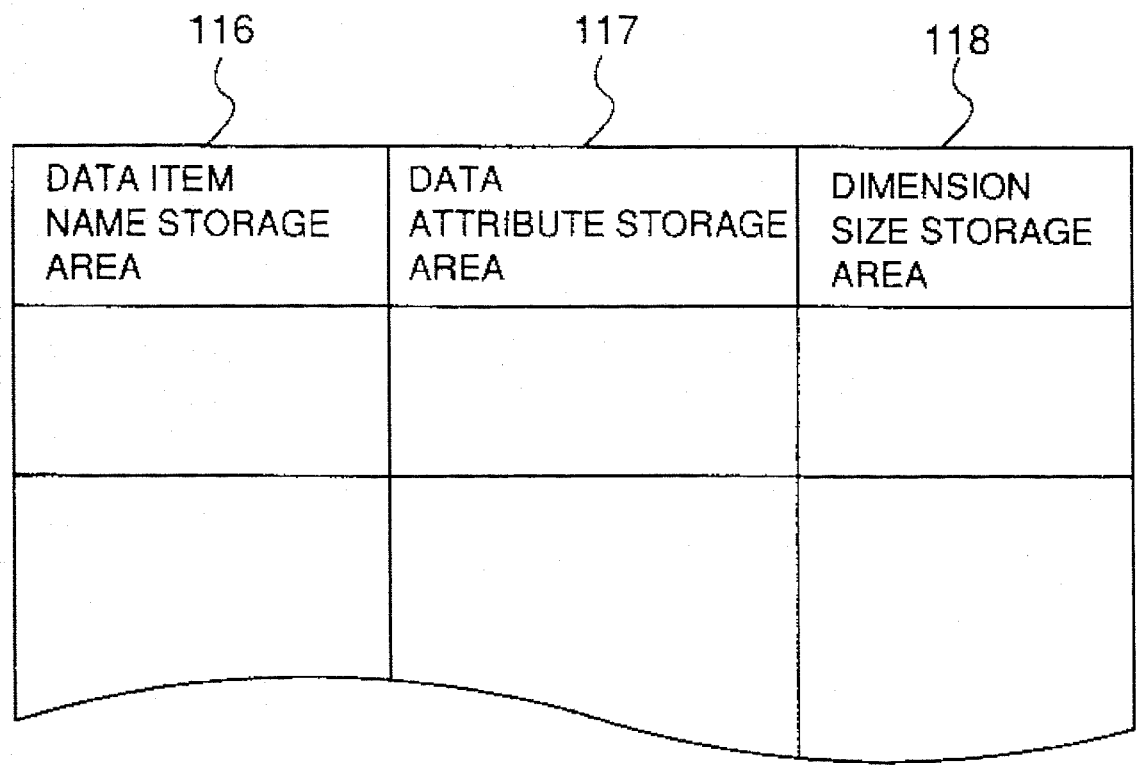
FIG. 6 is a view for explaining the file format of a data item definition file in one embodiment of the present invention.

FIG. 6 explains the file format of the data item definition file in one embodiment of the present invention. In this embodiment, one data item definition is composed of a data item name storage area 116, a data attribute storage area 117 indicative of the attribute of the data item at issue and a dimension number storage area 118 indicative of the dimension number of the data item at issue.

Figure 7:
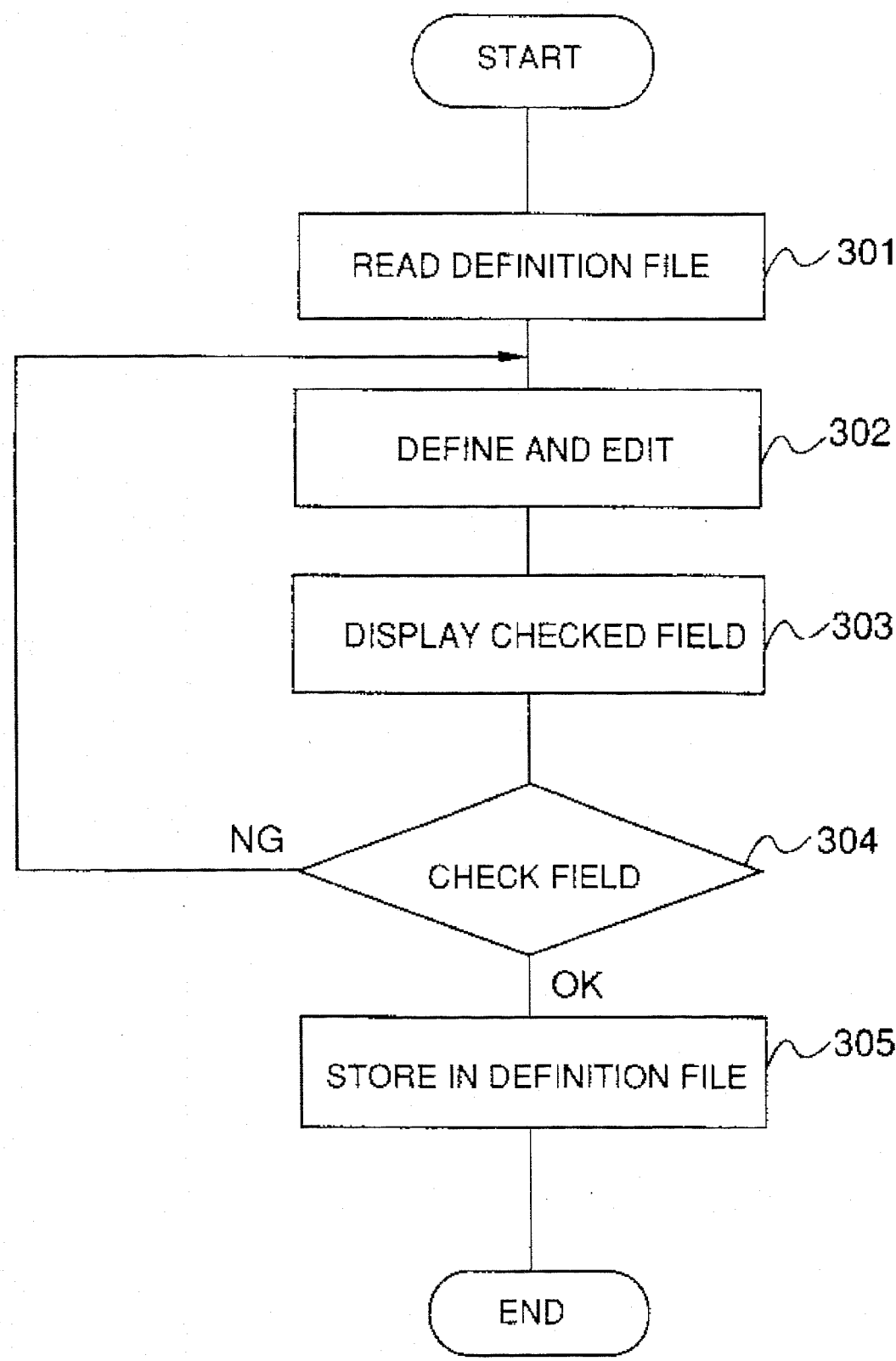
FIG. 7 is a flowchart showing the processing of a program for defining, checking and editing in one embodiment of the present invention.

FIG. 7 is a flowchart showing the processing of the program for defining, checking and editing in one embodiment of the present invention.

First, as shown in FIG. 7, the program 101 for defining, checking and editing as shown in FIG. 3 reads the definition files 103 to 105 (step 301), executes definition and editing for them in an interactive manner (step 302) and displays a checked field (step 303). If checking the displayed field is 'OK' (step 304), the defined contents are stored in the definition files 103 to 105 (step 305). If the checking is 'NG' in step 304, the processing is returned to the step 302 of definition and editing.

Meanwhile, FIGS. 1A and 1B explain the concepts of unification and separation of messages in one embodiment of the present invention.

The concept of unification of message data is shown in FIG. 1A. Before the unification of message data, modules A211 input message A201 and outputs a message C203 while a module B211 inputs a message B202 and outputs a message D204. In this case, if the respective contents of the messages A201 and B202 are the same or the message B202 is included in the message A201, these messages can be unified into the message A201. Therefore, after the unification of message data, modules A211 and B212 input the message A201 and output the messages C203 and D204, respectively.

The concept of message separation is shown in FIG. 1B. Before the separation of message data, a module C213 inputs a message E205 and outputs a message F206 while a module D214 inputs the message E205 and outputs a message G207. In this case, if the data items included in the message E205 can be separated into the data item(s) which is used by only the module C213 and the data item(s) which is used by only the module D214, after the separation, e.g. the message E205 will be separated into a message H208 and a message I209.

FIG. 8 shows a field of checking the defined contents of message data and data items in one embodiment of the present invention.

In the case where in this embodiment, the defined contents of the message data and data items are to be checked for unification/separation of message data, the message data used by a self-distributed software module and the data items constituting the message are cross-referenced with each other. Specifically, with the message data name in the horizontal axis on the checking field and the data item name in the vertical axis thereon, based on the definition contents, mark(s) * indicates the position of the data item constituting each message data.

As seen from FIG. 8, the message A201 is composed of data items 220 to 223 and the message B202 is composed of data items 221 and 222. In this case, since the message B202 is included in the message A201, these messages can be unified as the message A201. Further, the message E205 is separated into the messages H208 and I209.

Figure 9:
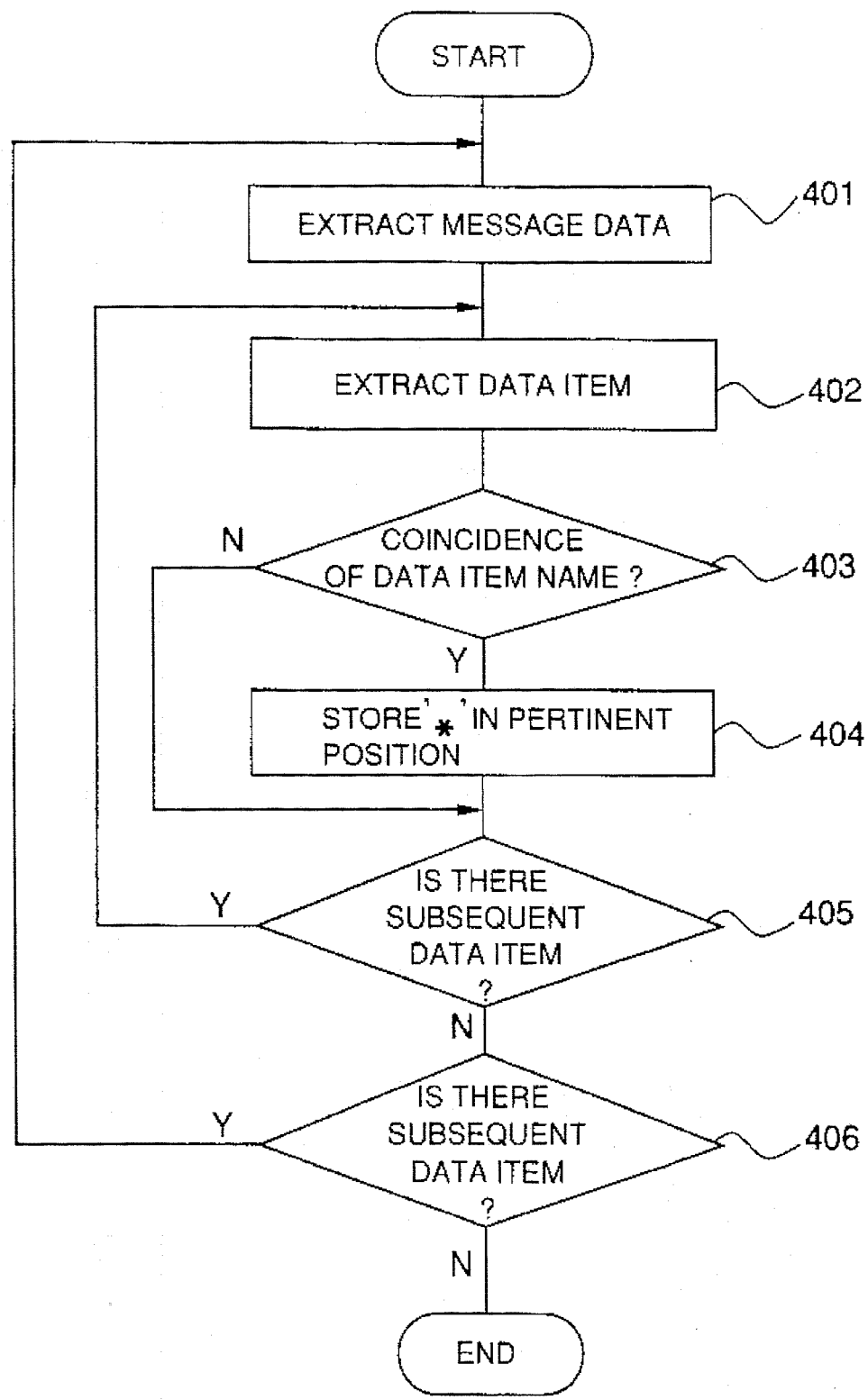
FIG. 9 is a flowchart for checking the definition contents of message data and data items in one embodiment of the present invention.

FIG. 9 is a flowchart for checking the definition contents of message data and data items in one embodiment of the present invention.

First, the definition contents of the head message data are extracted from the message data definition file 104 (step 401), and the definition contents of the head data item are extracted from the data item definition file 105 (step 402). In this case, if the data item name extracted from the message data definition file 104 coincides with the data item name extracted from the data item definition file 105 (step 402), the mark * is indicated at the pertinent position (step 403).

If not, no processing will be made. Next, whether or not the subsequent data item exists is determined (step 405). If it exists, the processing is returned to the step 402 to extract the pertinent data item. If it does not exist, a determination will be made as to whether or not the subsequent message data exists (step 406). If it exists, the processing is returned to the step 402 to extract the pertinent message data. If it does not exist (step 406), the processing of checking is stopped.

FIG. 10 shows a field of checking the defined contents of the software modules and message data.

In the case where in this embodiment, the defined contents of the self-distributed software modules and the message data are to be checked, the software models and the message data used are cross-referenced with each other. Specifically, with the module name in the horizontal axis on the checking field and the message data name in the vertical axis thereon, basis on the definition contents, mark "I" is indicated at the position of the message which is an input of each module and mark "O" is indicated at the position of the message which is an output of each module.

As seen from FIG. 10, the module A211 inputs the message A201 and outputs the message C203; the module B212 inputs the message B202 and outputs the message D204; the module C213 inputs the message E205 and outputs the message F206; and the module D214 inputs the message E205 and outputs the message G207. When messages are unified or separated, such indication enables the input and output of each module to be understood.

Figure 11:
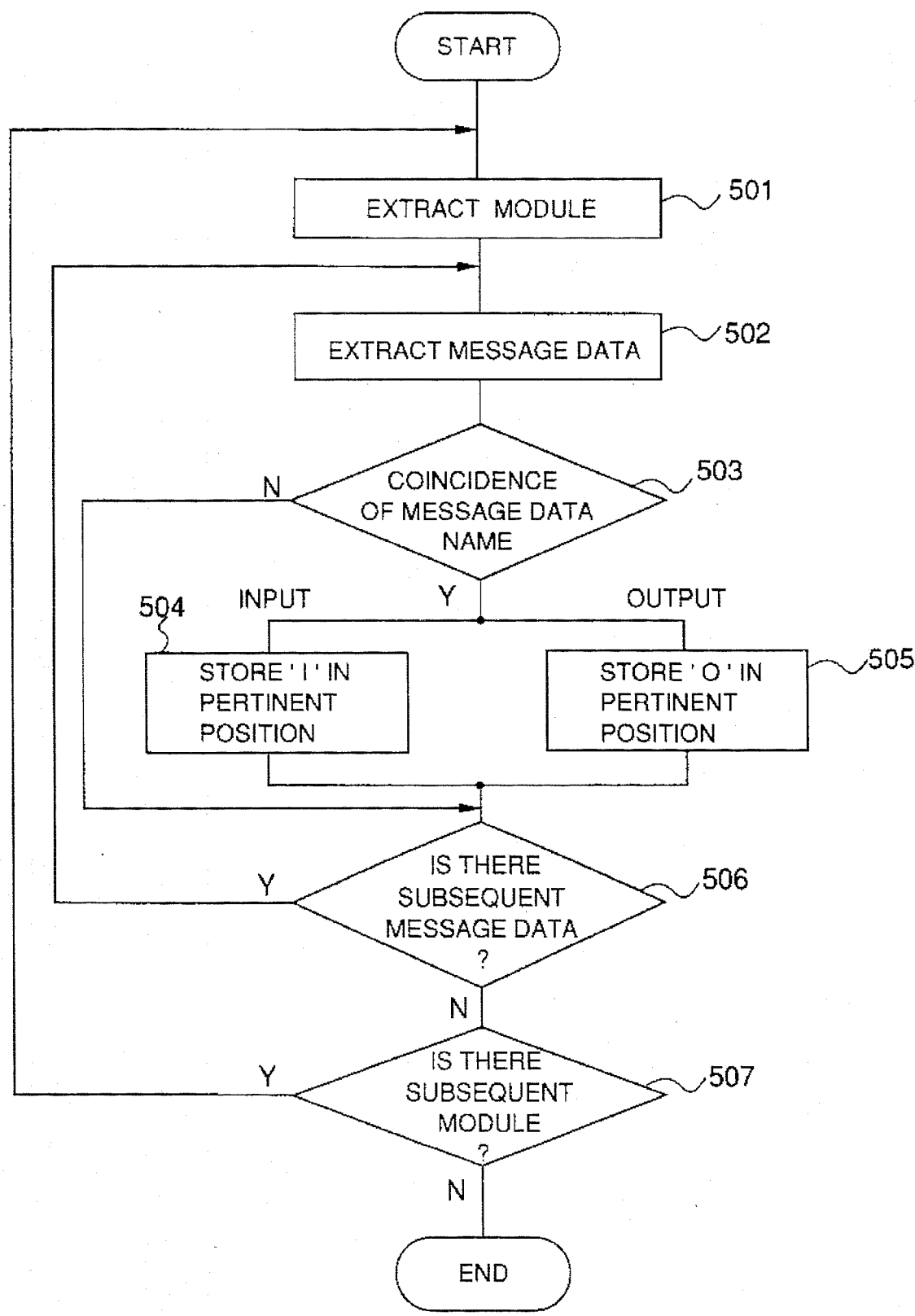
FIG. 11 is a flowchart of preparing the field for checking the software module and message data in one embodiment of the present invention.

FIG. 11 is a flowchart whether preparing a field of the definition contents of the software modules and message data in one embodiment of the present invention.

First, the definition contents of the head module are extracted from the module definition file 103 (step 501), and the definition contents of the head message data are extracted from the message data definition file 104 (step 502). In this case, if the message name extracted from the module definition file 103 coincides with the message data name extracted from the message data definition file 104 (step 503), and it is an input message, the mark "I" is indicated at the pertinent position (step 504). If it is an output message, the mark "O" is indicated at the pertinent position (step 505). Incidentally, if there is no coincidence in the step 502, no processing will be made. Next, whether or not the subsequent message data exists is determined (step 506). If it exists, the processing is returned to the step 502 to extract the pertinent message data. If it does not exist, a determination will be made as to whether or not the subsequent module exists (step 507). If it exists, the processing is returned to the step 502 to extract the pertinent module. If it does not exist (step 507), the processing of preparing a definition checking field is stopped.

As described above, in comparison with the contents already defined, the same contents (i.e. unnecessary parts) are canceled, some modification is made for input mistake, and the unification/separation of message data results are stored in the definition files 103 to 105.

Figure 12:
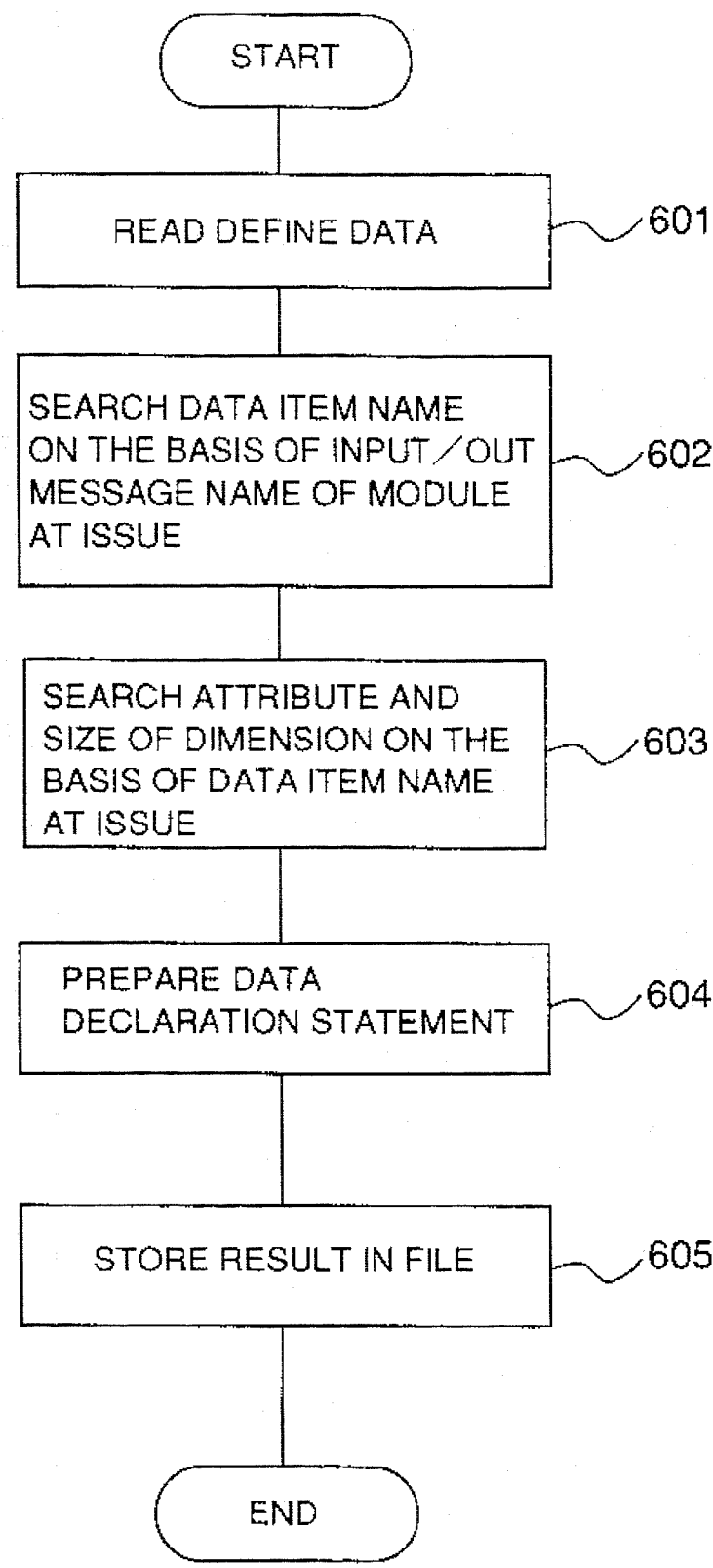
FIG. 12 is a flowchart showing the processing in a module source producing program in one embodiment of the present invention.

FIG. 12 is a flowchart for the processing of the module source producing program in one embodiment of the present invention.

First, the definition files 103 to 105 are read (step 601). On the basis of the input/output message names of the module to be produced, the data items constituting these messages are searched (step 602). On the basis of the data item names obtained in the step 602, the attribute and the dimension number of each of these data items are searched (step 603).

A data declaration statement corresponding to a programming language is prepared (step 604). The result thus produced is stored in the module source file (step 605).

In accordance with the embodiment of the present invention, in preparing a program, or designing modules, input message data and output message data can be unified and separated so that redundancy such as multi-definition can be saved, and using the design result thus prepared can improve the working efficiency in preparing the program.

Further, in the case where the operation of the system prepared in accordance with the embodiment of the present invention is to be provided with a module, its operation can be assured since it can be seen that consistency between the message data used by the module and the existing system is assured.

Figure 13:
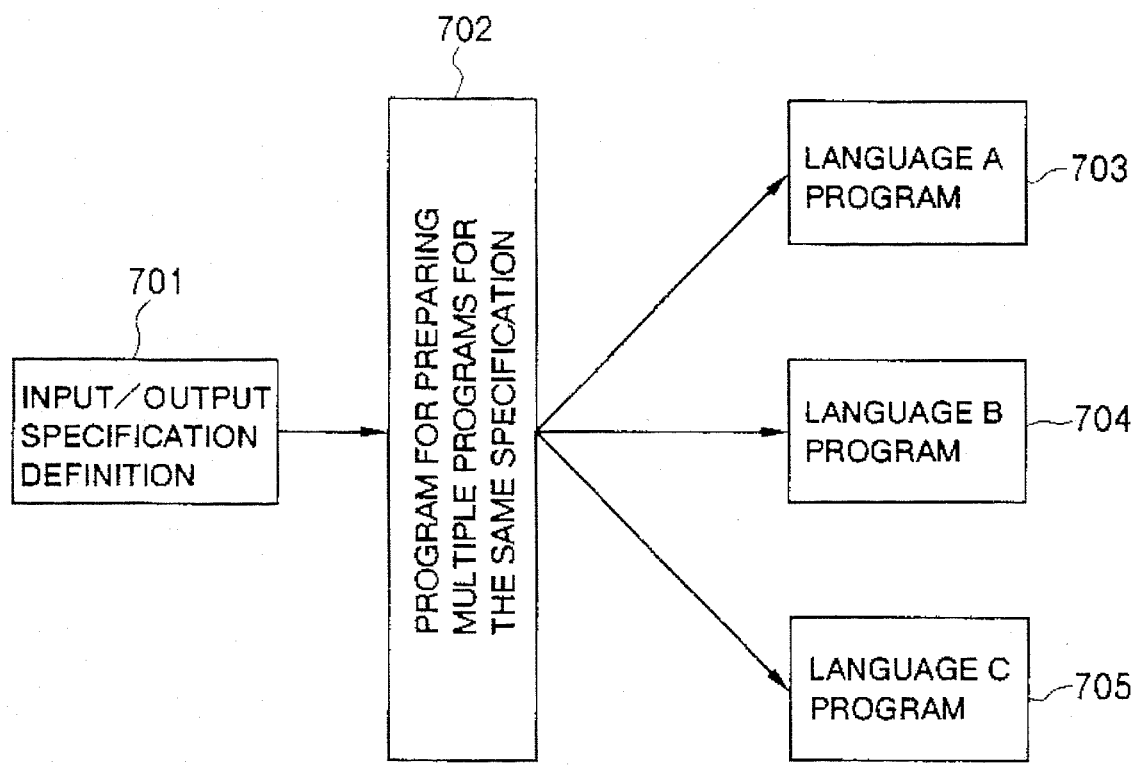
FIG. 13 is a schematic diagram of a system for preparing multiple programs for the same functional specification according to one embodiment of the present invention.
Figure 14:
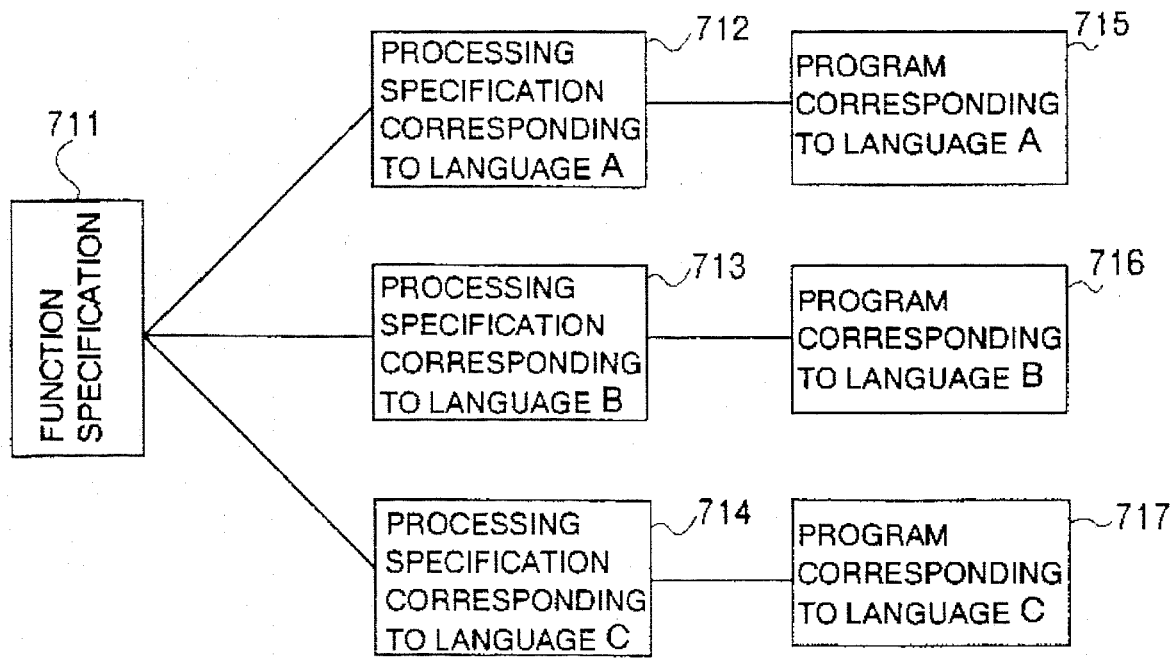
FIG. 14 is a schematic diagram of the prior art system for preparing multiple programs.

FIG. 13 is a conceptual view of one embodiment of the method of preparing multiple programs for the same functional specification according to the present invention.

First, an input/output specification definition 701 is input to a program 702 for producing multiple programs for the same functional specification. The program 702 produces a language A program 703, a language B program 704 and a language C program 705. In this case, the program 702 checks whether or not each of the language programs 703, 704 and 705 coincides with the structure of data items defined. If the answer is 'NO', the program 702 executes a structure transformation processing.

The reason why only the input/output relation can produce multiple programs on its specification definition is as follows. The input/output relation is defined by only data item names. The input/output relation defines the external specification indicative of the external relationship of a program but does not define a processing. Therefore, the input/output relation is not a program itself but a specification so that on the basis of the specification, it can produce multiple programs with different programming languages. On the other hand, an application processing relation cannot be defined only by data item names. Specifically, the application processing relation indicates the procedure of a processing (reading data, deciding values, operating them and writing the result) so that the processing procedure itself must consider a programming language. Thus, describing the processing procedure means preparing a program. Accordingly, unlike the input/output relation, the application relation cannot produce multiple programs.

Figure 15:
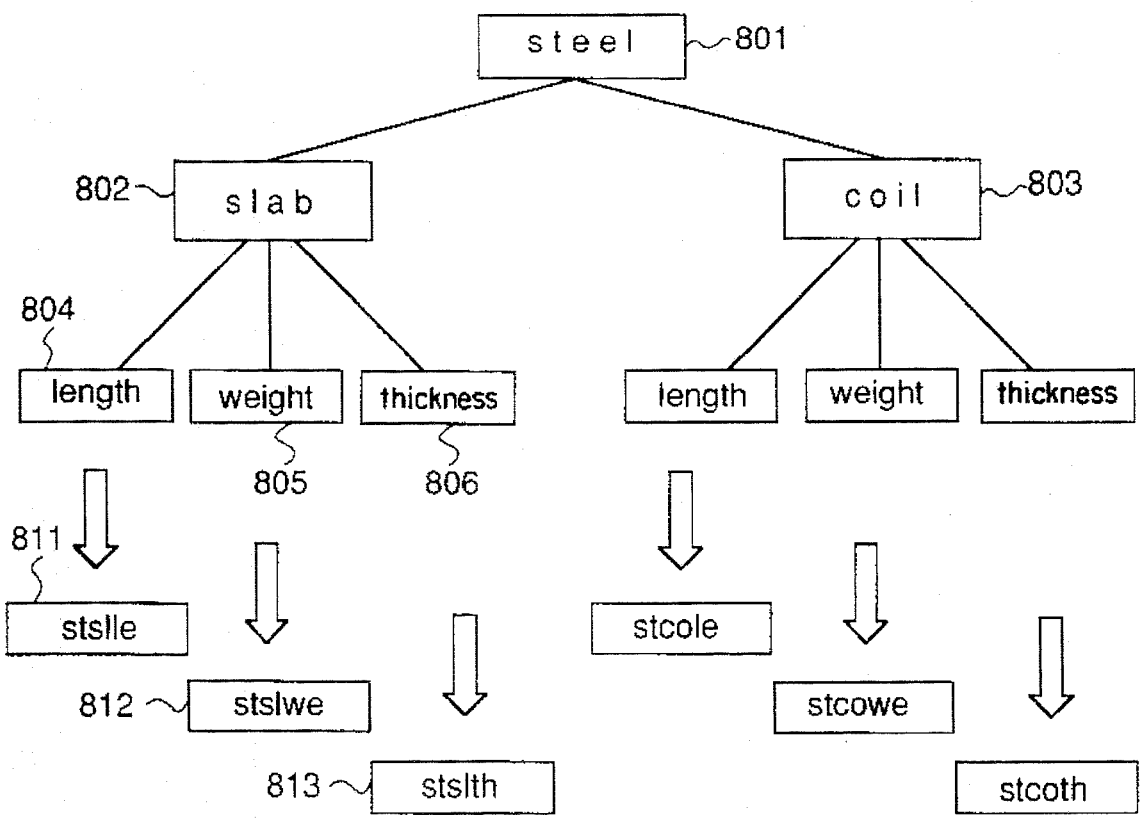
FIG. 15 is a view for explaining the operation of structure transformation in the present invention.

FIG. 15 explains the operation of data structure transformation executed by the program 702 for producing multiple programs for the same functional specification.

As seen from FIG. 15, a first-layer data name 801 includes a first second-layer data name 802 and a second second-layer data name 803. The first second-layer data name 802 includes a first third-layer data name 804, a second third-layer data name 805 and a third third-layer data name 806. Also, the second second-layer data name 803 includes the same third-layer data names as in the first second-layer data name 802.

Further, in FIG. 15, the data names after change can be designated by arrows. For example, in the case of changing the first third-layer data name 804, a first single-layer (non-level) data name 811 includes the head two characters of the respective names of the first-layer data name 801 and the first second-layer 802 to which the first third-layer data name 804 belongs. Likewise, a second single-layer data name 812 and a third single-layer data name 813 can be formed.

Figure 16:
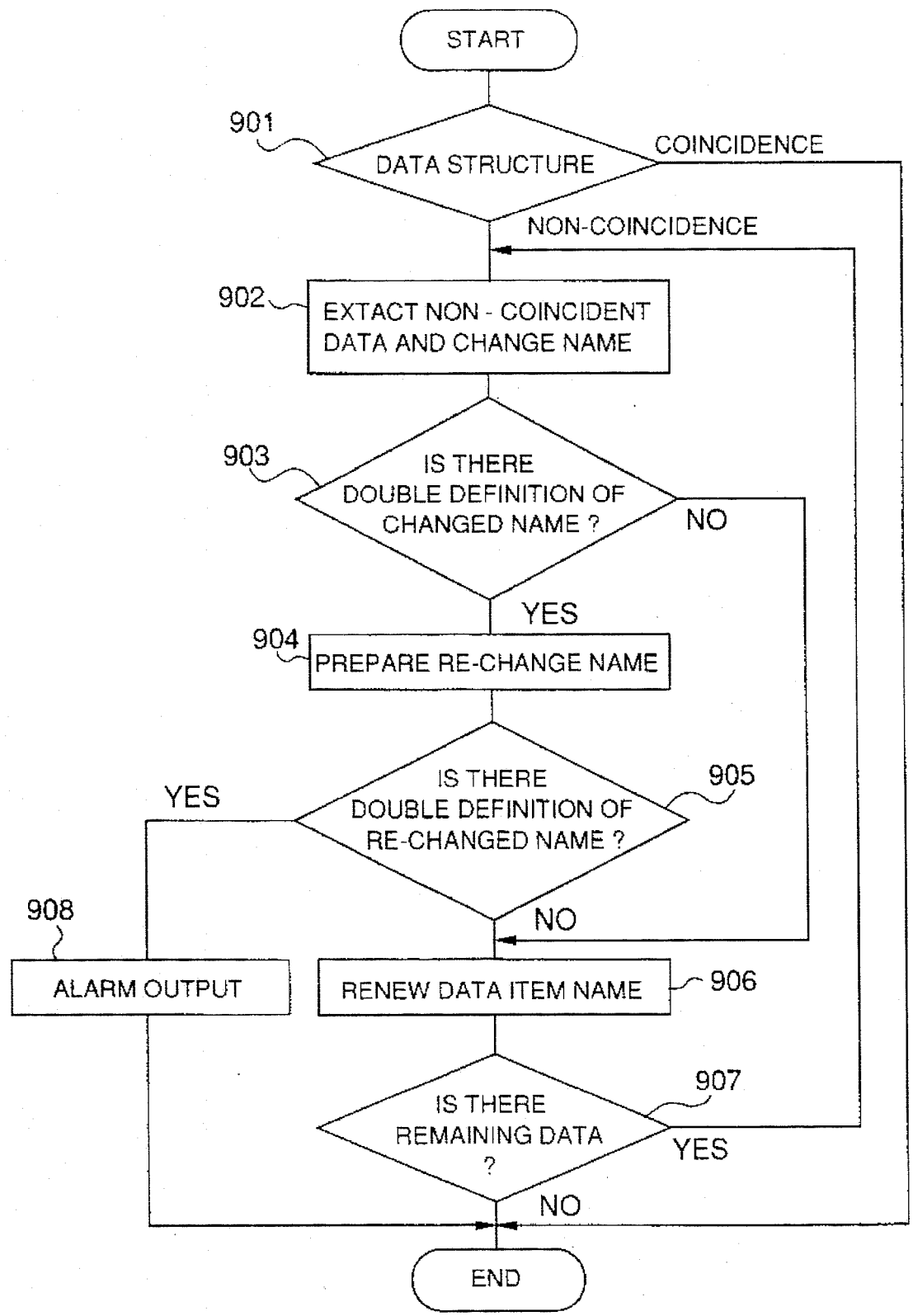
FIG. 16 is a flowchart of the processing in the structure transformation in FIG. 15.

FIG. 16 is a flowchart of the procedure of a data structure transformation processing which is to be executed by the program 702 for multiple programs.

The data structure is described for each of meaningful units of groups of data items. Some languages do not accept such a description. For example, the expressions such as ilinedt (information at line entrance side), ilinedt.thick (plate thickness at line entrance side), ilinedt.width (plated width at line entrance side), ilinedt.temp (temperature at line entrance side), etc. cannot be accepted by the FORTRAN language but accepted by the C language.

As seen from FIG. 16, first, a determination is made as to whether the structure of defined data items coincides with the structure permitted by the language at issue (step 901) If the answer is 'YES', the processing is stopped since no transforamtion is required. If it is 'NO', one data item name with inconsistency is taken and the name changed for it is tentatively made through the technique as shown in FIG. 15 (step 902). Whether or not the changed data name means a double definition is determined. If it is not directed to the double definition, the data name at issue is renewed and the changed name is registered (step 903). If the changed data name means the double definition, a changed name is made again by increasing the number of characters from the head or displacing its extraction starting position (step 904). Again, whether or not the changed data name means a double definition is determined (step 905). If the data name has been doubly defined, an output of alarm is produced to complete the transformation processing. If the data name has not been doubly defined, the changed data name is newly registered (step 906). Whether or not there is any remaining data is determined (step 907). If there is no remaining data, the transformation processing is completed. If there is any remaining data, the processing is returned to the step 902.

Figure 17:
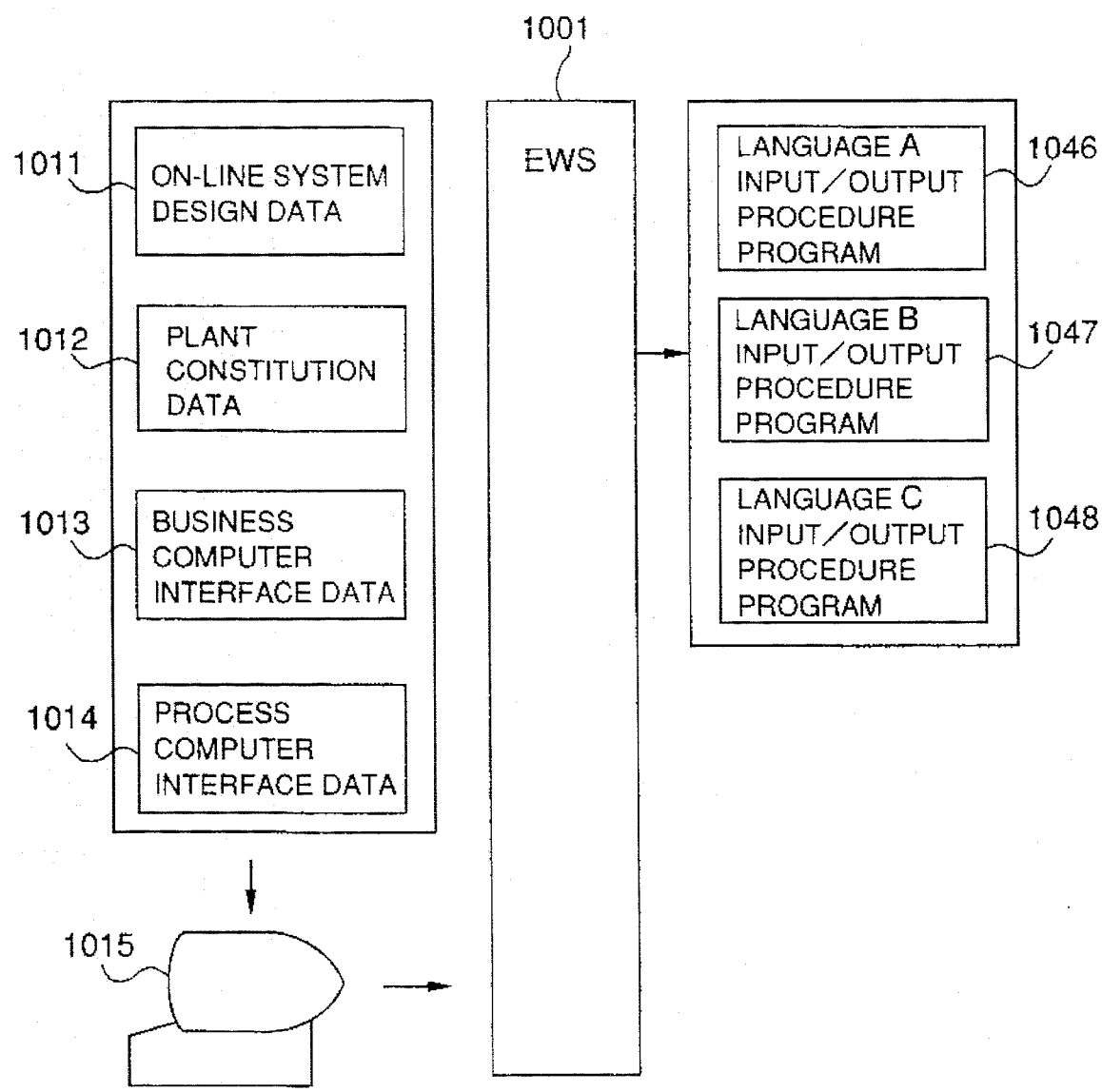
FIG. 17 is a view showing the entire arrangement of a system for preparing multiple programs for the same functional specification.

FIG. 17 is a schematic view showing the entire arrangement of a system for supporting production of multiple programs according to one embodiment of the present invention.

In FIG. 17 a supporting processing device 1001 produces a language A input/output procedure program, a language B input/output procedure program and a language C input/output procedure program on the basis of on-line system design data 1011, plant constitution data 1012, business computer interface data 1013 and process computer interface data 1014 which are sent through an input device 1015.

The on-line system design data 1011 indicate a line construction (for each kind of processing such as slit lined and a first recoil line) and is referred to when the message is named like e.g. a slit handling message and a recoil handling message.

The plant constitution data 1012 indicates an arrangement of an upper and a lower stream and arranging order of like components. These data are referred to for message designing such as tracking at entrance side, tracking at exit side, first tandem mill processing result, and second tandem mill processing result.

The business computer interface data 1013 are referred to for designing the interface with a business computer such as production plan data and production result reporting data.

The process computer interface data 1014 are referred to for designing the interface (e.g. pressed load detecting data and control amount of motor torque) with a computer which is used for a controller such as a measuring device and an electric control device).

It should be noted that the supporting processing device 1001 prepares an instruction for taking out respective data items in accordance with the length defined by a lump of data without any decision and operation after message data have been taken in.

Figure 18:
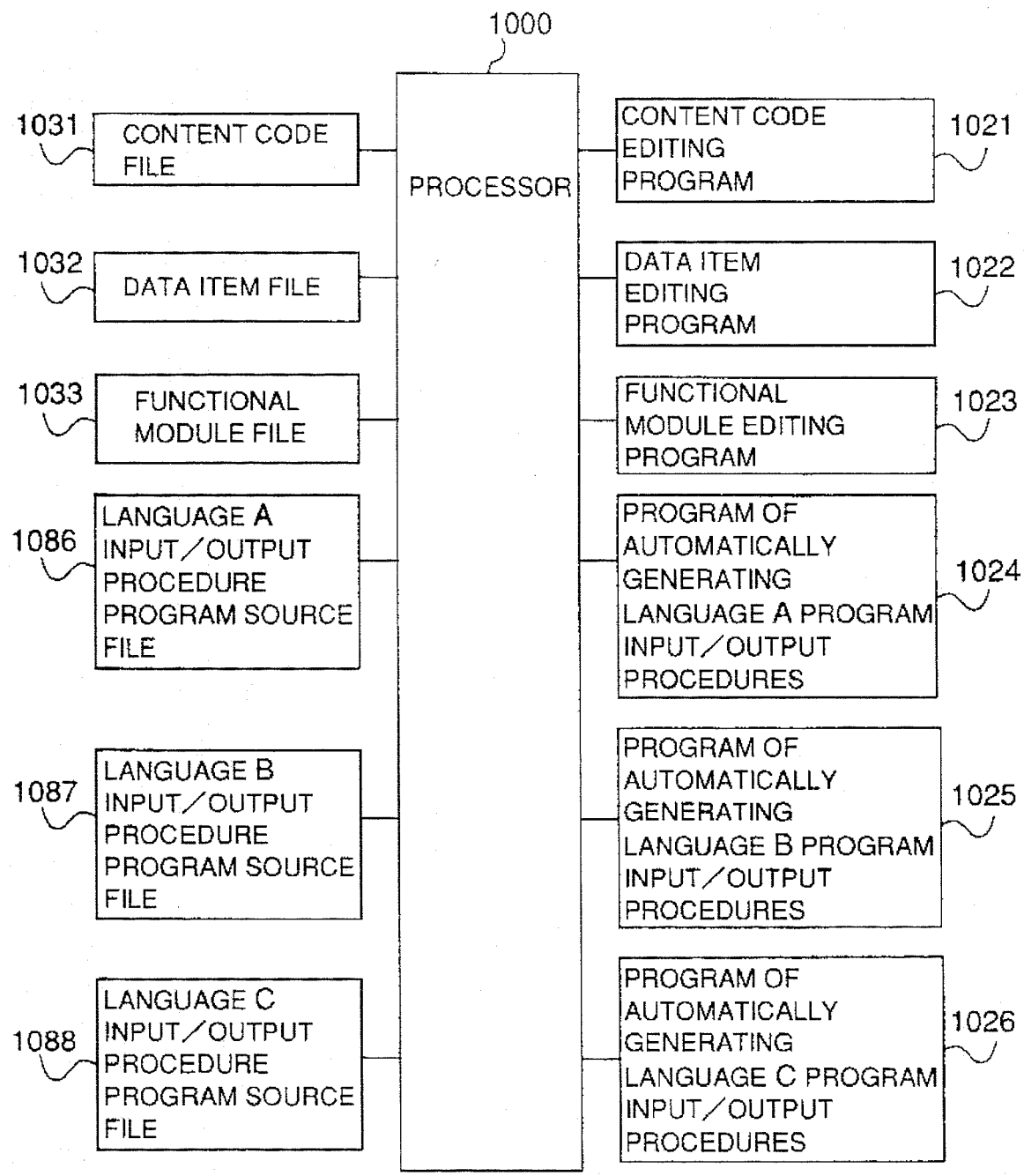
FIG. 18 is a view showing the arrangement of functions in the system of FIG. 5.

FIG. 18 shows an arrangement of functions included in the supporting device of FIG. 17.

A processor 1000 previously includes a group of input data files of a content code file 1031, a data item file 1032 and a functional module file 1033, and programs for preparing the group of input data files of a content code editing program 1021, a data item editing program 1022 and a functional module editing program 1023. Further, the processor 1000 previously includes a group of source files of a language A input/output procedure program source file 1086, a language B input/output procedure program source file 1087 and a language C, and a group of programs 1024, 1025 and 1026 for automatically preparing these language A, B and C program input/output source programs, respectively.

Figure 19:
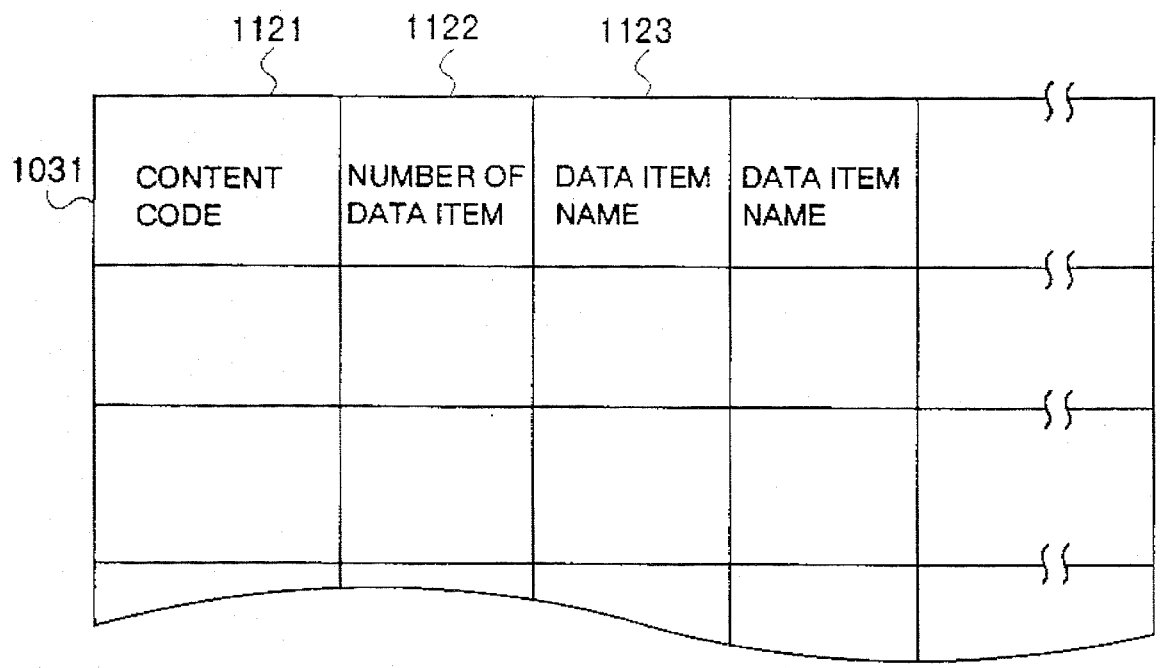
FIG. 19 is a detailed view of the contents code file in FIG. 18.

FIG. 19 shows the details of the content code file 1031 in FIG. 18.

In FIG. 19, a content code 1121 is a code given to data item names 1123 corresponding to the number 1122 of data items. Such a format is repeated for each content code. The content code 1121 includes e.g. information of the processing result at entrance side and information of coil tracking. The data item number 1122 includes the value such as 120 and 50. The data item name 1123 includes the name such as an entrance side plate thickness and a coil length.

FIG. 20 shows the details of the data item file 1032 in FIG. 18.

A data item name 1131 is composed of the attributes of information of a data unit length 1132, the size of dimension 1131, a data code 1134 and signing or unsigning. Such a format is repeated for each data item name 1131.

In this case, signing or unsigning indicates whether or not the value of the data item is equipped with the sign of + or −. The data code is a code describing the data; for example, the ASCII code represents a character (alphabet, katakana, hiragana, etc.), and the binary code represents a numerical value (e.g. 1024, 2, etc.). This code also is one of attributes of the data item. The size of dimension represents repeat of data. For example, the expression of a heating furnace temperature hottmp (16) represent that there are 16 temperature data at different positions (hottmp ( ) refers to the dimension and 16 refers to the size). Further, the data unit length refers to the byte (8 bits) length of the data handled by the program.

Figure 21:
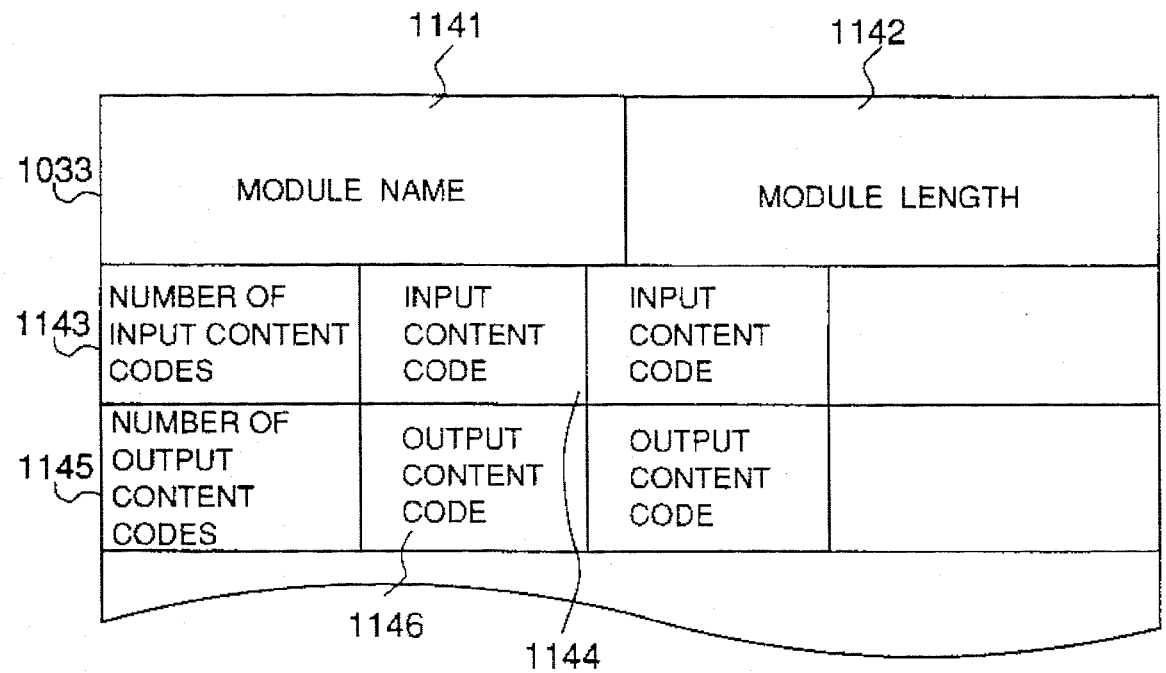
FIG. 21 is a detailed view of the function module in FIG. 18.

FIG. 21 shows the details of the functional module file 1033.

In FIG. 21, a module length 1142 indicates the length of a program with a module name 1141. The input content code 1143 required as an input of the module corresponds to the number of input content codes whereas the output content code 1145 corresponds to the number of output content codes 1146. In this case, the module refers to a program. The input content codes include items of information of the entrance side processing result and coil tracking. These codes include an abbreviation SCCNSG for a content code, a name, line running coil information, abbreviations kscoil, linespd, lport for data items.

FIG. 22 schematically explains the program for automatically preparing the language A input/output procedures.

The processing 1024 of automatically preparing the language A program input/output procedures extracts the input content code 1143 and the output content code 1146 of a designated module from the functional module file 1033, and searches the content code file 1031 on the basis of the content codes extracted to extract the attributes of the corresponding data item names 1131 from the data item file 1032. Specifically, in response to an input instruction 1192, the processing 1024 takes in the data item 1131 on the basis of the attributes of the data unit length 1132, the size of dimension 1133 and the data code 1134 and signing and unsigning 1135 and prepares a decomposition instruction 1294 for each input data item 1131 in terms of its attributes of the data unit length 1132, the size of dimension 1133, the data code 1134 and signing or unsigning thereby to develop an input processing procedure 1296. Further, in order to output the item data in response to an output synthesizing instruction 1293, the data are unified in accordance with the attributes of each of data items 1131 to be output through an output processing procedure 1297. Thus, an input/output specification program 1291 consists of only the input processing procedure 1296 and the output processing procedure 1297.

In this case, the input instruction 1292 means taking in a message which is actually the macro instruction such as rcvmsg (fc, msg) (fc: content code, msg: message storage position). The decomposition instruction 1294 cuts out each data item in accordance with the length defined by a lump of the data, e.g. is developed as dcldia=* (msg++), dcldia: data item and exit side coil external diameter, dscoilno=* (msg++), dzcoilno: data item exit side coil number, etc. Further, the output synthesizing instruction 1293 means inversion of the decomposing instruction, i.e. serves to unify the data items into a message. This instruction is actually developed as * (msg++)=dcomfx, * (msg++)=dctip, etc. Incidentally, a macro instruction sndmsg (fc, msf) as an output instruction will be prepared. Thus, the process of unification has been explained.

FIG. 23 schematically explains the program for automatically preparing the language B input/output procedures.

The processing 1025 of automatically preparing the language A program input/output procedures extracts the input content code 1143 and the output content code 1146 of a designated module from the functional module file 1033, and searches the content code file 1031 on the basis of the content codes 1121 extracted to extract the attributes of the corresponding data item names 1131 from the data item file 1032. Specifically, the processing 1025 prepares a decomposition instruction 1284 for each input data item 1131 in terms of its attributes of the data unit length 1132, thereby developing the input processing procedure 1286. Further, in order to output the item data in response to an output synthesizing instruction 1283, the data are unified in accordance with the attributes of each of data items 1131 to be output through an output processing procedure 1297. Thus, an input/output specification program 1281 consists of only the input processing procedure 1286 and the output processing procedure 1287.

FIG. 24 schematically explains the program for automatically preparing the language C input/output procedures.

The processing 1026 of automatically preparing the language A program input/output procedures extracts the input content code 1143 and the output content code 1146 of a designated module from the functional module file 1033, and searches the content code file 1031 on the basis of the content codes extracted to extract the attributes of the corresponding data item names 1131 from the data item file 1032. Specifically, in response to an input instruction 1172, the processing 1026 takes in the data item 1131 on the basis of the attributes of the data unit length 1132, the size of dimension 1133 and the data code 1134 and signing and unsigning 1135 and prepares a decomposition instruction 1294 for each input data item 1131 in terms of its attributes of the data unit length 1132, the size of dimension 1133, the data code 1134 and signing or unsigning thereby to develop an input processing procedure 1276. Further, in order to output the item data in response to an output synthesizing instruction 1273, the data are unified in accordance with the attributes of each of data items 1131 to be output through an output processing procedure 1277. Thus, an input/output specification program 1271 consists of only the input processing procedure 1276 and the output processing procedure 1277.

Figure 25:
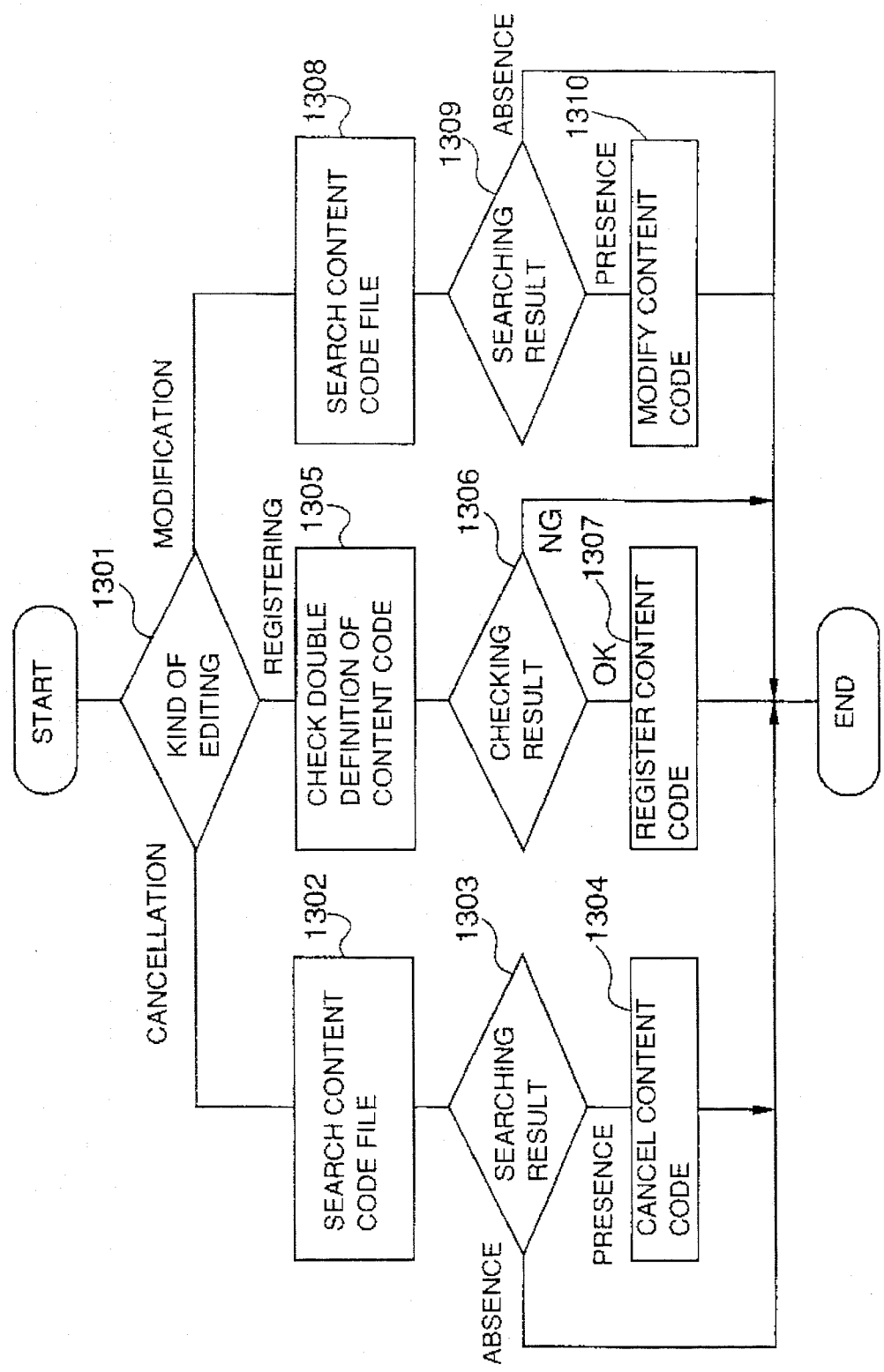
FIG. 25 is a flowchart of the processing procedure of a content code editing program.

FIG. 25 is a flowchart of the processing procedure the content code editing program.

First, the kind of editing is determined (step 1301). If it is new registering, the content code file 1031 is searched to check for double defining indicating that the registered data are already present in the file (steps 1305 and 1306). In the case of no double defining, the data to be registered are registered. In the case of double definition, the processing is ended.

If the kind of editing is modification, the same checking is made as in the case of registering (steps 1308 and 1309), and the pertinent part of the content code file 1031 is modified (step 1310). If the kind of editing is cancellation, the pertinent code is searched from the content code file 1031 (steps 1302 and 1303), and it is canceled (step 1304).

Figure 26:
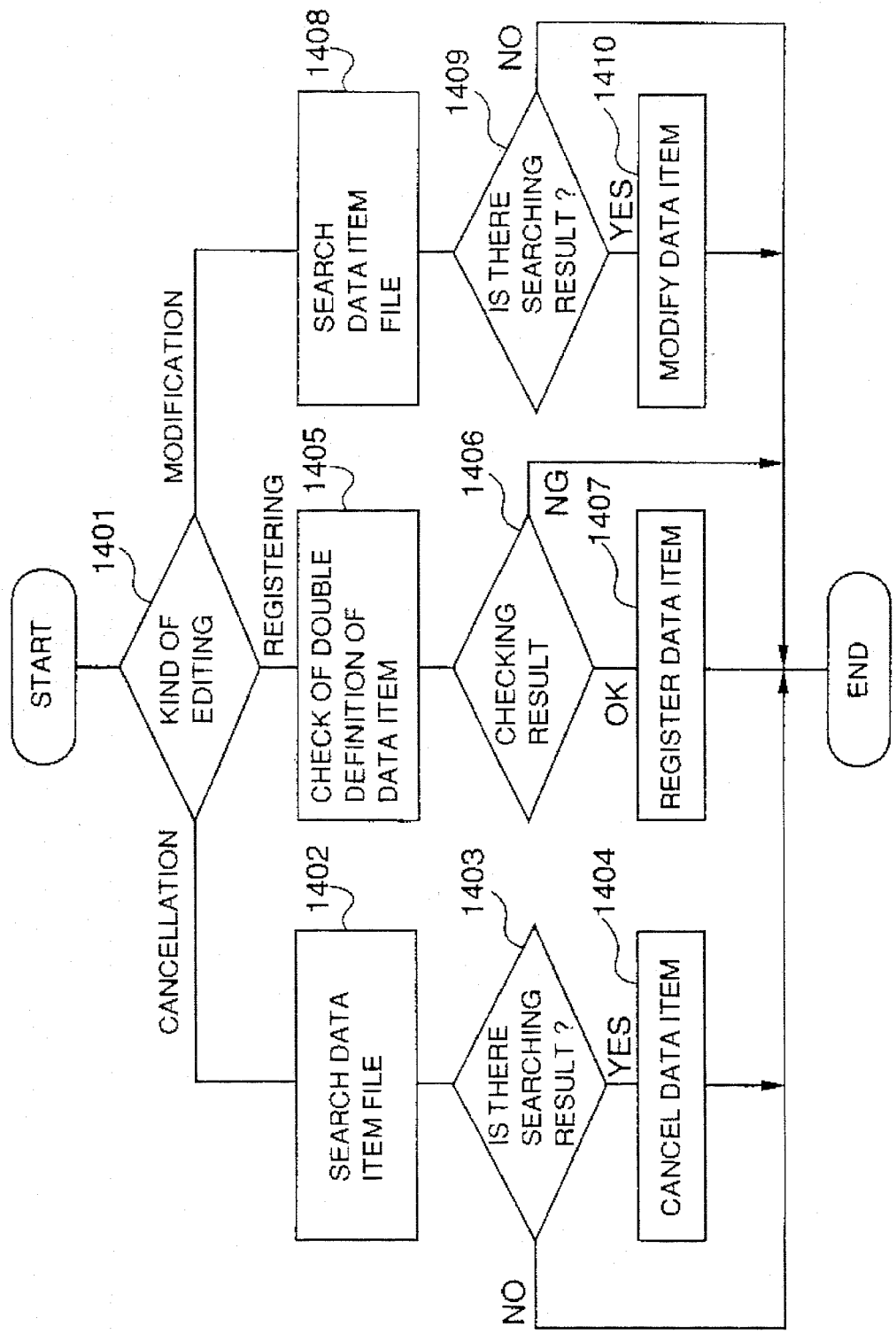
FIG. 26 is a flowchart of the processing procedure of a data item editing program.

FIG. 26 is a flowchart of the processing procedure the content code editing program.

First, the kind of editing is decided (step 1401). If it is new registering, the content code file 1031 is searched to check double defining indicative of that the registered data are already present in the file (steps 1405 and 1406). In the case of no double checking, the data to be registered are registered. In the case of double definition, the processing is ended.

If the kind of editing is modification, the same checking is made as in the case of registering (steps 1408 and 1409), and the pertinent part of the content code file 1031 is modified (step 1310). If the kind of editing is cancellation, the pertinent code is searched from the content code file 1031 (step 1402 and 1403), and it is canceled (step 1404).

Figure 27:
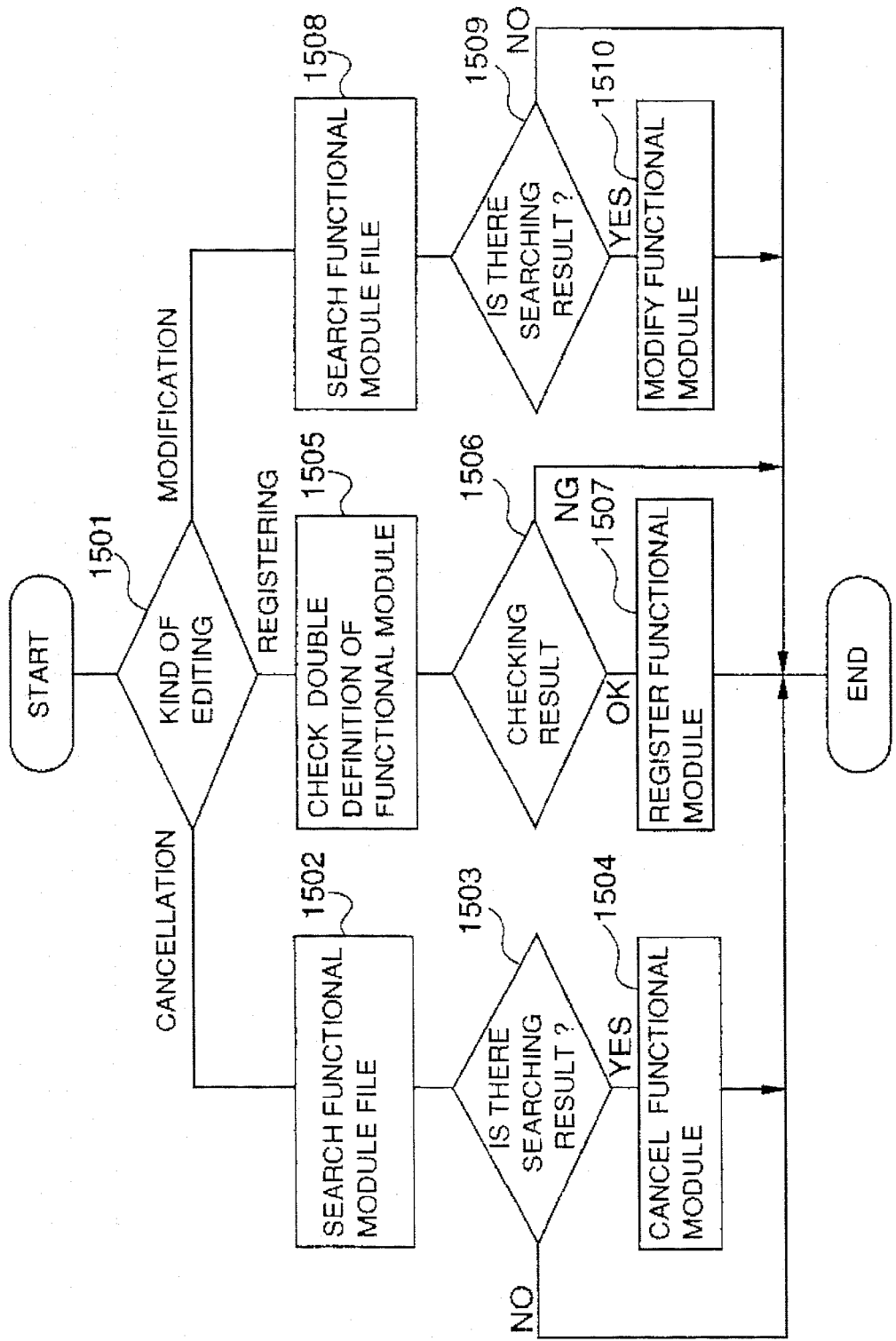
FIG. 27 is a flowchart of the processing procedure of a functional module editing program.

FIG. 27 is a flowchart of the processing procedure of the functional module editing program.

First, the kind of editing is decided (step 1501). If it is new registering, the functional module file 1033 is searched to check double defining indicative of that the registered data are already present in the file (steps 1505 and 1506). In the case of no double definition, the data to be registered are registered in the functional module file (1507). In the case of double definition, the processing is ended.

If the kind of editing is modification, the same checking is made as in the case of registering (steps 1508 and 1509), and the pertinent part of the functional module file 1033 is modified (step 1501). If the kind of editing is cancellation, the pertinent data is searched from the functional module file 1033 (steps 1502 and 1503) and it is cancelled (step 1504).

Figure 28:
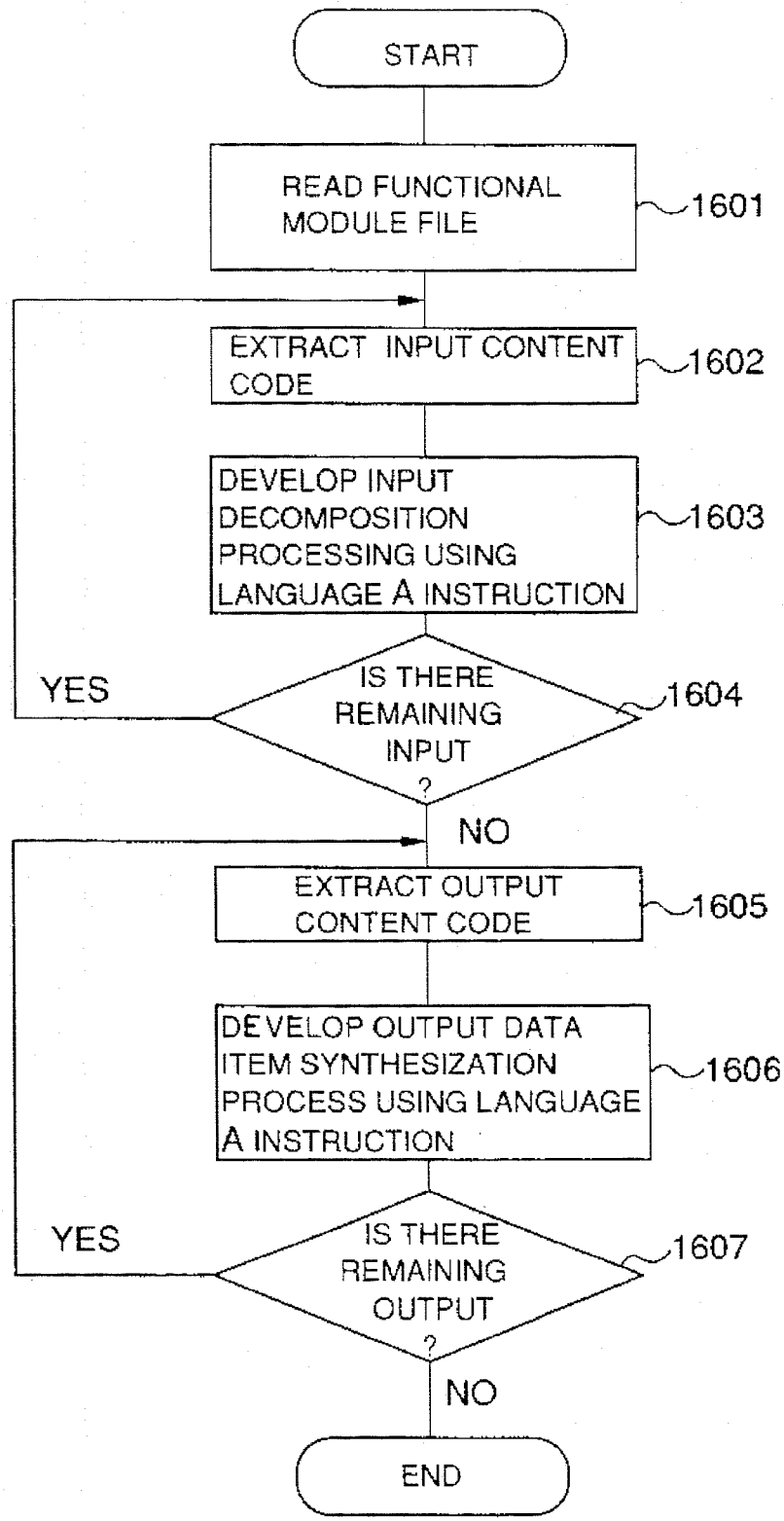
FIGS. 28, 29 and 30 are flowcharts of the processing procedures of automatic generation programs for input and output procedures with program languages A, B and C, respectively.

FIG. 28 is a flowchart showing the processing procedure of automatically generating the language A input/output procedures.

First, a functional module data is extracted from the functional module file 1033 (step 1601). Input content codes are extracted one by one (step 1602), and the decomposing processing of cutting out the data item belonging to the content code at issue from a group of data items is developed using the language A (step 1603). This processing is performed for all the data items corresponding to the content codes (step 1604). Likewise, the processing of incorporating the data items into each output content code to be synthesized is developed using the language A (steps 1605, 1606 and 1607). Thus, a program source file 1086 for the language A input/output procedures will be prepared.

Incidentally, it should be noted that a similar processing is performed for the developments of the input data item decomposition processing by the language A instruction (step 1603) and the output data item synthesization processing by the language A instruction (step 1606). For example, the processing is performed for each object language in the input decomposition processing instruction, macro instructions such as rcvmsg (fc, msg) (fc: content code, msg: message storage area). In the output data item synthesization processing instruction, the data items are collected into a message to be developed as e.g. * (msg++)=dcomfx, and * (msg++)=dctip.

Figure 29:
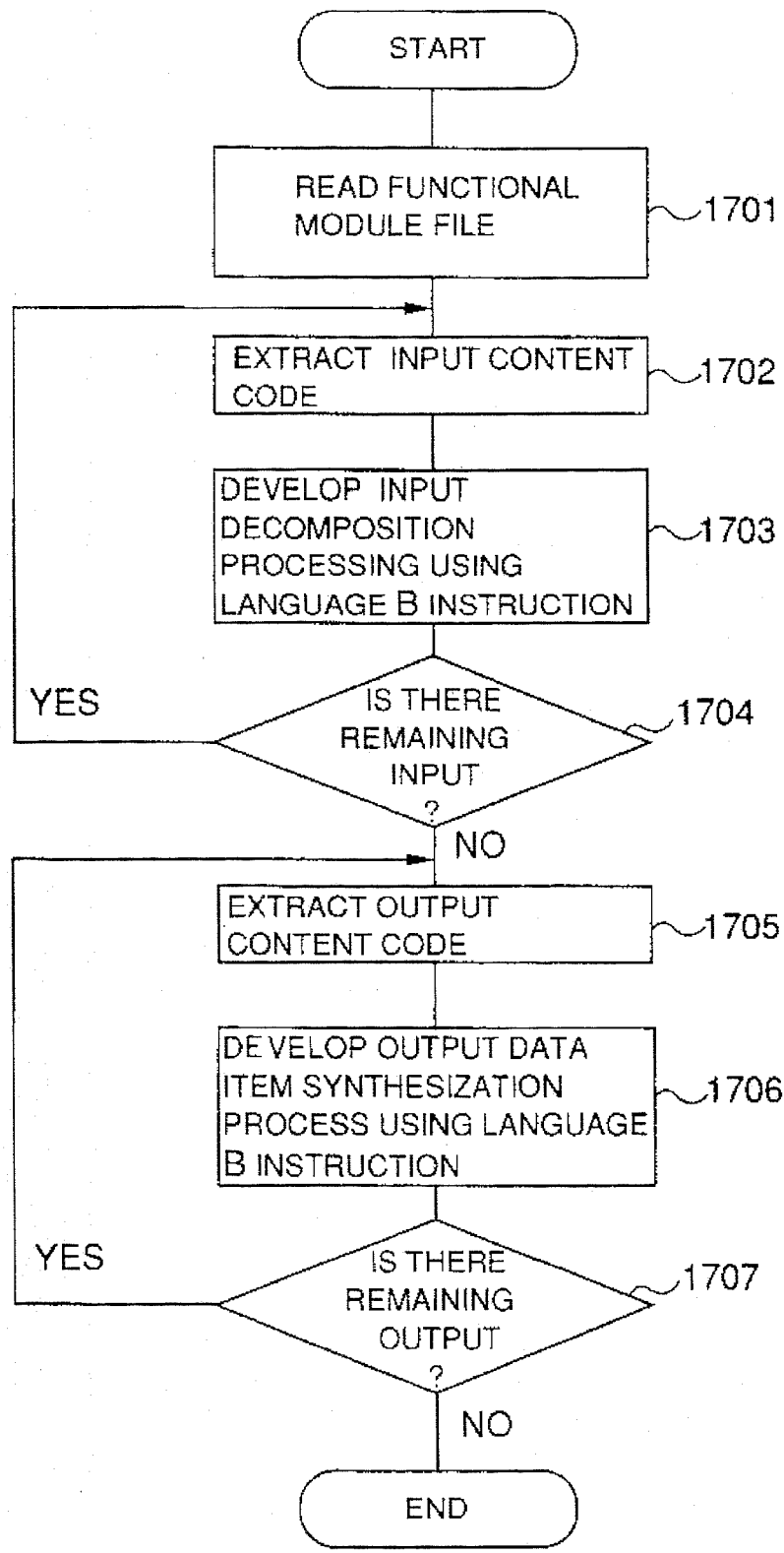

FIG. 29 is a flowchart showing the processing procedure in the program for automatically generating the language B input/output procedures.

First, a functional module data is extracted from the functional module file 1034 (step 1701). Input content codes are extracted one by one (step 1702), and the decomposing processing of cutting out the data item belonging to the content code at issue from a group of data items is developed using the language A (step 1703). This processing is performed for all the data items corresponding to the content codes (step 1704). Likewise, the processing of incorporating the data items into each output content code to be synthesized is developed using the language A (steps 1705, 1706 and 1707). Thus, a program source file 1087 for the language B input/output procedures will be prepared.

Figure 30:
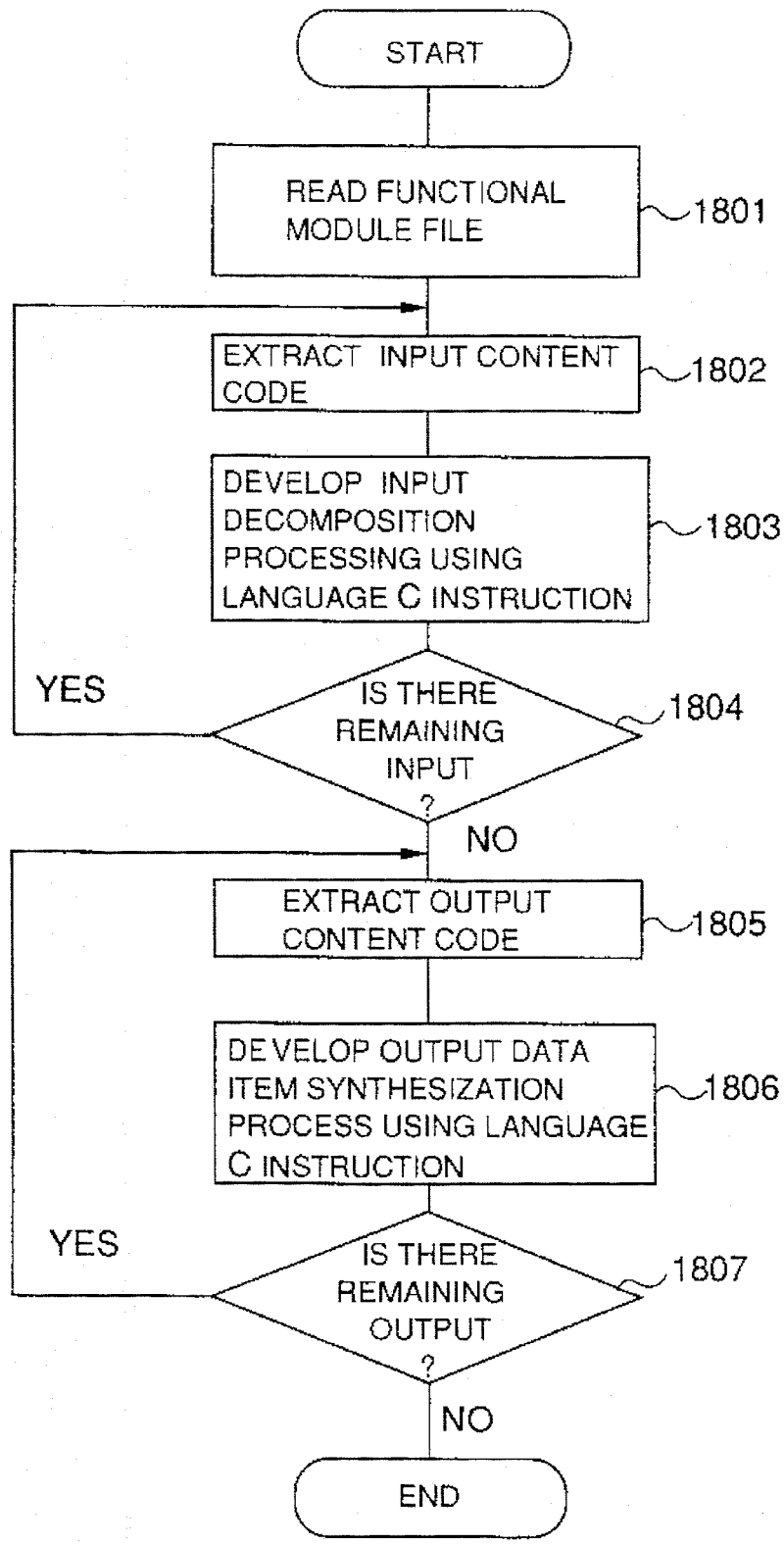

FIG. 30 is a flowchart showing the processing procedure in the program for automatically generating the language C input/output procedures.

First, a functional module data is extracted from the functional module file 1035 (step 1801). Input content codes are extracted one by one (step 1802), and the decomposing processing of cutting out the data item belonging to the content code at issue from a group of data items is developed using the language A (step 1803). This processing is performed for all the data items corresponding to the content codes (step 1804). Likewise, the processing of incorporating the data items into each output content code to be synthesized is developed using the language A (steps 1805, 1806 and 1807). Thus, a program source file 1089 for the language C input/output procedures will be prepared.

As described above, in accordance with the embodiment of the present invention, using the same input/output specification, multiple different programs for different languages can be automatically generated so that the production efficiency of a multiple version program is greatly improved. Further, the data structure can be transformed so as to coincide with the function of a programming language without changing its defined contents so that multiple programs can be easily generated.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A method for producing, using a processor and a storage device, a plurality of program modules, each having input message data and output message data, the program modules being coupled to each other by interchanging input and output message data, said method comprising the steps of:

storing a name of message data and names of data items constituting the message data in each of already produced program modules as a data base in said storage device;

checking for repetition or similarity between a combination of data item names of message data of a new program module and a combination of data item names of each of the message data already stored in said storage device, in defining both input and output message data of the new program module;

assigning and storing a name of message data of the new program module in the storage device, the name of the message data of the new program module being the same as a name of message data having repetition or similarity stored in the storage device to assure consistency of said message data already stored in said storage device, if a result of said checking step shows repetition or similarity; and assigning and storing a name of message data of the new program module and names of data items constituting the message data of the new program module in the storage device as one of the message data of the already produced program modules, if the result of said checking step does not show repetition or similarity.

2. A software preparing method according to claim 1, wherein both the input and output message data include at least one data item, said checking step further comprises the sub-steps of:

in defining at least one data item constituting one of said input and output message data of said new program module, checking if there exists message data in said storage device including said at least one data item; and if a result of the checking sub-step determines that message data does exist, said message data of said new program module including said at least one data item is unified with corresponding message data including said at least one data item in said storage device.

3. A method for producing a plurality of program modules, each having input message data and output message data in a distributed system having a plurality of processors and a storage device, said method comprising the steps of:

storing a name of message data and names of input and output constituting message data in each of program modules already produced by said processors as a data base in said storage device;

checking for repetition or similarity between a combination of data items of message data of a new program module and a combination of data item names of each of the message data already stored in said storage device, in defining each of input and output message data of the new program module by each of said processors;

assigning and storing a name of message data of the new program module in the storage device, the name of the message data of the new program module being the same as a name of message data having repetition or similarity stored in said storage device by each of said processors to assure consistency of said message data already stored in said storage device, if a result of the checking step show repetition or similarity; and assigning and storing a name of message data of the new program module and names of data items constituting the message data in the storage device by each of said processors as one of message data of the already produced program modules, if the result of the checking step does not show repetition or similarity.

4. A software preparing method according to claim 3, wherein each of the input and output message data includes at least one data item, and said checking step further comprises the sub-steps of:

in defining at least one data item including one of the input and output message data of said new program module by each of said processors, checking if there exists message data in said storage device including said at least one data item; and if a result of the checking sub-step determines that message data exists, the message data of said new program module including said at least one data item is unified by each of said processors with corresponding message data including said at least one data item in said storage device.

* * * * *